US010705283B2

(12) United States Patent
Liu et al.

(10) Patent No.: US 10,705,283 B2
(45) Date of Patent: Jul. 7, 2020

(54) LIGHT SOURCE MODULE AND DISPLAY APPARATUS

(71) Applicant: Nano Precision Taiwan Limited, Hsinchu County (TW)

(72) Inventors: Kuan-Wen Liu, Hsin-Chu (TW); Chi-Lung Lee, Hsin-Chu (TW); Hao-Jan Kuo, Hsin-Chu (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 98 days.

(21) Appl. No.: 15/448,613

(22) Filed: Mar. 3, 2017

(65) Prior Publication Data
US 2017/0261672 A1    Sep. 14, 2017

(30) Foreign Application Priority Data

Mar. 9, 2016 (CN) .......................... 2016 1 0131382

(51) Int. Cl.
*F21V 8/00* (2006.01)

(52) U.S. Cl.
CPC ........... *G02B 6/005* (2013.01); *G02B 6/0038* (2013.01); *G02B 6/0053* (2013.01); *G02B 6/0068* (2013.01); *G02B 6/0076* (2013.01)

(58) Field of Classification Search
CPC .. G02B 6/0011; G02B 6/0013; G02B 6/0016; G02B 6/0018; G02B 6/0021; G02B 6/003; G02B 6/0031; G02B 6/0033; G02B 6/0036; G02B 6/0038; G02B 6/0043; G02B 6/0053; G02B 6/0055; G02B 6/0073; G02B 6/0076; G02B 6/0083; G02B 6/0075; G02B 6/0068; G02B 6/001; G02B 6/0015;
(Continued)

(56) References Cited

U.S. PATENT DOCUMENTS

| 5,897,184 | A  | * | 4/1999 | Eichenlaub | .......... | G02B 6/0031 |
| | | | | | | 349/64 |
| 7,478,913 | B2 | * | 1/2009 | Epstein | .................. | G02B 5/045 |
| | | | | | | 349/62 |
| 9,201,188 | B2 | * | 12/2015 | Kim | ..................... | G02B 6/0036 |

(Continued)

FOREIGN PATENT DOCUMENTS

CN        1632667 A  *  6/2005
CN        101684927     3/2010
(Continued)

*Primary Examiner* — Erin Kryukova
(74) *Attorney, Agent, or Firm* — JCIPRNET

(57) ABSTRACT

A light source module including a first light guide plate, a first light source, a second light guide plate, a second light source, and a turning film is provided. The first light guide plate and the second light guide plate are sequentially stacked up. The second light guide plate is disposed between the first light guide plate and the turning film. The turning film has a plurality of prism columns, the prism columns face the second light guide plate. The first light guide plate includes a first light exiting surface, the first light exiting surface is located at a side facing the turning film and has a plurality of lenticular lens structures. The lenticular lens structures are arranged along a first direction and extended along a second direction perpendicular to the first direction. Besides, a display apparatus is also provided.

11 Claims, 17 Drawing Sheets

(58) Field of Classification Search
CPC .. G02F 1/133; G02F 1/1323; G02F 1/133615; G02F 1/133606; G02F 1/133607
See application file for complete search history.

(56) References Cited

U.S. PATENT DOCUMENTS

| | | | | |
|---|---|---|---|---|
| 2004/0136173 A1* | 7/2004 | Tsai | G02B 6/0036 | 362/613 |
| 2006/0114372 A1* | 6/2006 | Saito | G02B 6/0038 | 349/64 |
| 2006/0250544 A1* | 11/2006 | Ohkawa | G02B 6/0076 | 349/65 |
| 2007/0076434 A1* | 4/2007 | Uehara | G02B 6/0053 | 362/616 |
| 2007/0147088 A1* | 6/2007 | Chien | G02B 6/0038 | 362/616 |
| 2008/0112187 A1* | 5/2008 | Katsumata | G02B 6/0068 | 362/611 |
| 2008/0151577 A1* | 6/2008 | Li | G02B 6/0016 | 362/620 |
| 2009/0067156 A1* | 3/2009 | Bonnett | G02B 6/0068 | 362/97.2 |
| 2009/0295744 A1* | 12/2009 | Onishi | G06F 3/0412 | 345/173 |
| 2010/0220260 A1* | 9/2010 | Sugita | G02B 6/003 | 349/62 |
| 2012/0032997 A1* | 2/2012 | Cha | H04N 13/305 | 345/690 |
| 2012/0105765 A1* | 5/2012 | Kawai | G02F 1/133605 | 349/62 |
| 2012/0134175 A1* | 5/2012 | Kunimasa | G02B 6/0016 | 362/602 |
| 2012/0235891 A1* | 9/2012 | Nishitani | G02B 3/0056 | 345/102 |
| 2012/0249407 A1* | 10/2012 | Hatakeyama | G02B 6/0068 | 345/102 |
| 2012/0250348 A1* | 10/2012 | Kim | G02B 6/0016 | 362/602 |
| 2013/0003176 A1* | 1/2013 | Yang | G02B 27/2214 | 359/463 |
| 2013/0093980 A1* | 4/2013 | Goto | G02B 6/0038 | 349/65 |
| 2013/0286679 A1* | 10/2013 | Chen | G02B 6/0053 | 362/607 |
| 2014/0043377 A1* | 2/2014 | Tanaka | G02B 6/0053 | 345/690 |
| 2015/0055366 A1* | 2/2015 | Chang | G02B 6/0036 | 362/606 |
| 2015/0124478 A1* | 5/2015 | Ohkawa | G02B 6/0091 | 362/606 |
| 2015/0185398 A1* | 7/2015 | Chang | G02B 6/0038 | 362/619 |
| 2015/0268404 A1* | 9/2015 | Chiu | G02B 6/0036 | 362/606 |
| 2016/0054507 A1* | 2/2016 | Hirayama | G02B 6/0053 | 349/65 |
| 2016/0109638 A1* | 4/2016 | Kinoshita | G02B 6/0073 | 362/607 |
| 2017/0010407 A1* | 1/2017 | Huang | G02B 6/0068 | |
| 2017/0018254 A1* | 1/2017 | Chang | G09G 5/02 | |
| 2017/0192158 A1* | 7/2017 | Lee | G02B 6/0036 | |
| 2017/0205558 A1* | 7/2017 | Hirayama | G02B 6/00 | |
| 2019/0243052 A1* | 8/2019 | Hamilton | C03C 15/00 | |

FOREIGN PATENT DOCUMENTS

| | | | |
|---|---|---|---|
| CN | 102168841 | | 8/2011 |
| CN | 102640039 | | 8/2012 |
| CN | 104848052 | | 8/2015 |
| JP | 2002236218 A | * | 8/2002 |
| JP | 4485999 B2 | * | 6/2010 |
| TW | I263845 | | 10/2006 |
| TW | I321694 | | 3/2010 |
| TW | I429971 | | 3/2014 |
| TW | 201443520 | | 11/2014 |
| WO | WO 2014194636 A1 | * | 12/2014 ......... H04N 13/0418 |

* cited by examiner

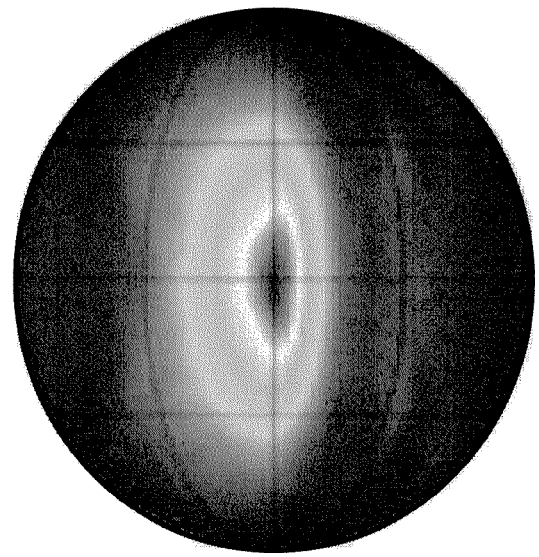
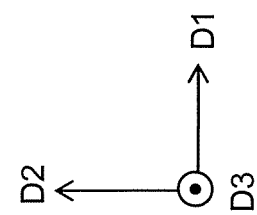
FIG. 2C
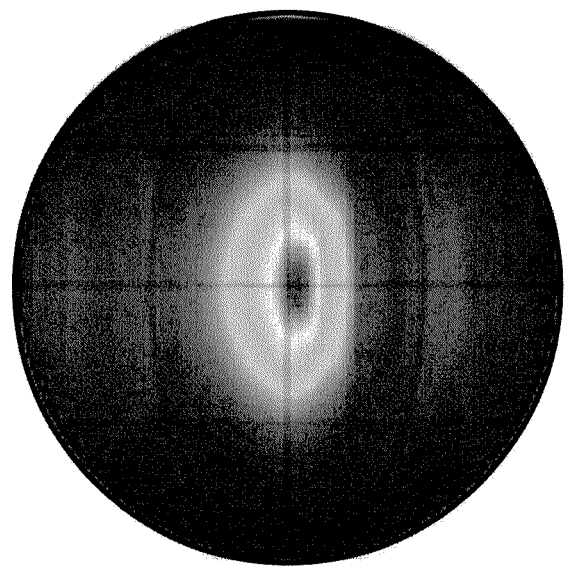
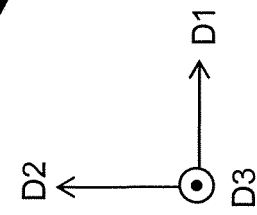
FIG. 2B

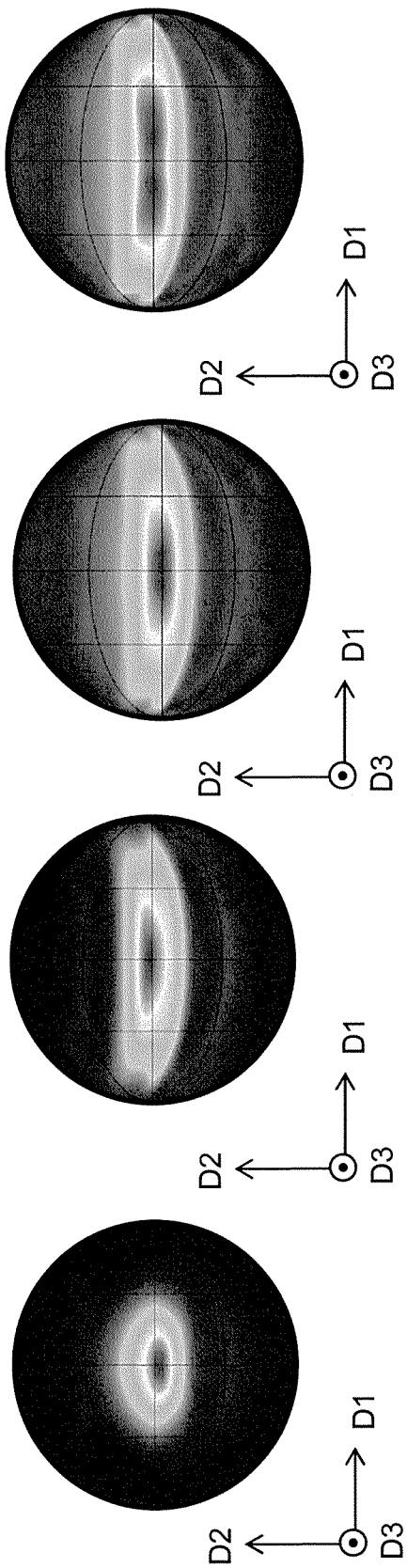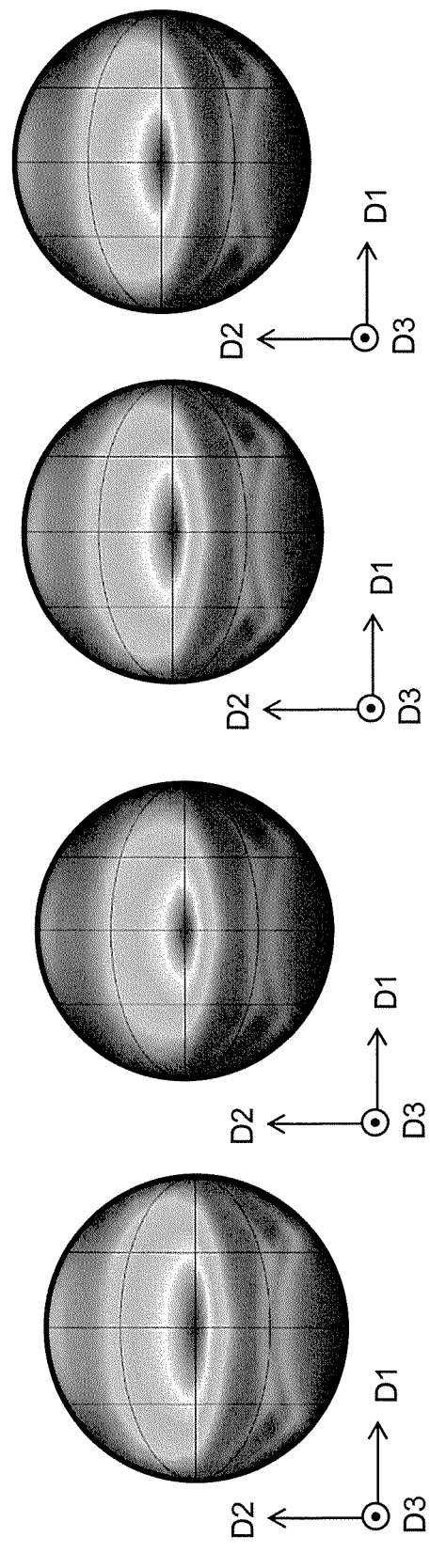

LIGHT SOURCE MODULE AND DISPLAY APPARATUS

CROSS-REFERENCE TO RELATED APPLICATION

This application claims the priority benefit of China application serial no. 201610131382.0, filed on Mar. 9, 2016. The entirety of the above-mentioned patent application is hereby incorporated by reference herein and made a part of this specification.

BACKGROUND OF THE INVENTION

Field of the Invention

The invention relates to a light source module and a display apparatus, and more specifically to a light source module having two light guide plates and a display apparatus.

Description of Related Art

Liquid crystal displays (LCD) have been broadly applied in various aspects of our daily life, such as being applied in informational household appliances including notebooks, liquid crystal monitors, portable consumer audio-video products, mobile phones, and liquid crystal TVs, etc. Since the display panel in a liquid crystal display does not emit light, the light source module that provides light is a key component of the liquid crystal display.

In relevant research on displays in recent years, the anti-spy function of displays becomes more and more important. Since users hope that, when using relevant products, the individual privacy may also be protected, more and more people add an anti-spy function to their screens, and the products suitable for adding the anti-spy capability expand further from notebook computers and liquid crystal monitors to portable consumer audio-video products, such as mobile phones and tablets, etc. Currently, the main stream of the anti-spy design is to add an anti-spy film to shield a large angular beam, so as to prevent others from viewing. However, such anti-spy film makes the brightness in the front perspective lower and reduces the display sharpness. Also, the user must carry the anti-spy film all the time, making it inconvenient to use. Alternatively, some technologies utilize the spirality of twist nematic (TN) liquid crystal in different blocks of the screen, such that the viewer may perceive different brightnesses at different angles, thereby accomplishing the effect of anti-spy. However, controlling the liquid crystal molecules to have different inclination angles in different display areas make the manufacturing process more difficult. Another alternative is to utilize the optical properties of the vertically aligned (VA) liquid crystal to produce a designed anti-spy pattern on the mobile phone to interfere others' viewing. However, such technology makes the brightness of the mobile phone lower, and the designed anti-spy pattern is unable to completely shield the contents being displayed. Thus, the anti-spy effect of the display is not desirable.

Moreover, users also desire to optionally select whether to use anti-spy function. Therefore, their own privacy is protected after the anti-spy function is used, and others may view the contents of the display after the anti-spy function is not used. Consequently, how to make the display have a good anti-spy effect and to optionally select whether to use the anti-spy function is indeed one of the topics that researchers in this field commit their self to.

The information disclosed in this "BACKGROUND OF THE INVENTION" section is only for enhancement of understanding of the background of the described technology, and therefore it may contain information that does not form the prior art that is already known to a person of ordinary skill in the art. Further, the information disclosed in this "BACKGROUND OF THE INVENTION" section does not mean that one or more problems to be resolved by one or more embodiments of the invention was acknowledged by a person of ordinary skill in the art.

SUMMARY OF THE INVENTION

The invention provides a light source module capable of selecting light that exits with a smaller light divergence angle, such that the display apparatus has an anti-spy effect.

The invention provides a display apparatus having an anti-spy effect.

The other objectives and advantages of the invention may be further understood through the technical features disclosed in the invention.

In order to achieve at least one of the above-mentioned objectives, one embodiment of the invention provides a light source module. The light source module includes a first light guide plate, a first light source, a second light guide plate, a second light source, and a turning film. The first light source is disposed beside the first light guide plate. The first light guide plate and the second light guide plate are sequentially stacked up. The second light source is disposed beside the second light guide plate. The second light guide plate is disposed between the first light guide plate and the turning film. The turning film has a plurality of prism columns, the prism columns face the second light guide plate. The first light guide plate includes a first light exiting surface, the first light exiting surface is located at a side of the first light guide plate facing the turning film and has a plurality of lenticular lens structures. The lenticular lens structures are arranged along a first direction, and the lenticular lens structures are extended along a second direction perpendicular to the first direction.

In order to achieve at least one of the above-mentioned objectives, one embodiment of the invention provides a display apparatus. The display apparatus includes a display panel and a light source module. The light source module is configured to provide a light beam to the display panel. The light source module includes a first light guide plate, a first light source, a second light guide plate, a second light source, and a turning film. The first light source is disposed beside the first light guide plate. The first light guide plate and the second light guide plate are sequentially stacked up. The second light source is disposed beside the second light guide plate. The second light guide plate is disposed between the first light guide plate and the turning film. The turning film has a plurality of prism columns, the prism columns face the second light guide plate. The first light guide plate includes a light exiting surface located at a side facing the turning film of the first light guide plate. The light exiting surface has a plurality of lenticular lens structures. The lenticular lens structures are arranged along a first direction, and the lenticular lens structures are extended along a second direction perpendicular to the first direction.

Based on the above, the embodiments of the invention have at least one of the advantages or effects below. In the light source module and the display apparatus of the embodiments of the invention, the first light guide plate and the second light guide plate are sequentially stacked up, and the second light guide plate is disposed between the first light guide plate and the turning film. The first light source is disposed beside the first light guide plate, and the second light source is disposed beside the second light guide plate. The first light guide plate includes a first light exiting surface, the first light exiting surface is located at a side of the first light guide plate facing the turning film and has a plurality of lenticular lens structures. The lenticular lens structures are arranged along the first direction, and the lenticular lens structures are extended along the second direction perpendicular to the first direction. The lenticular lens structures may reduce the light divergence angle of the light beam emitted from the first light source. Therefore, the light source module in the embodiments of the invention is capable of selecting light that exits with a smaller light divergence angle, such that the display apparatus has an anti-spy effect.

In order to make the aforementioned and other features and advantages of the invention more comprehensible, embodiments accompanying figures are described in detail belows.

BRIEF DESCRIPTION OF THE DRAWINGS

FIG. 2B is an analog view illustrating a view angle distribution when the light source module of the embodiment in FIG. 2A is in an anti-spy mode.

FIG. 2C is an analog view illustrating a view angle distribution when the light source module of the embodiment in FIG. 2A is in a wide viewing angle mode.

FIG. 6A is an analog view illustrating a view angle distribution of a light source module having a single light guide plate in an embodiment of the invention.

FIG. 6B is an analog view illustrating a view angle distribution of a light source module having a single light guide plate in another embodiment of the invention.

FIG. 6C is an analog view illustrating a view angle distribution of a light source module having a single light guide plate in yet another embodiment of the invention.

FIG. 6D is an analog view illustrating a view angle distribution of a light source module having a single light guide plate in yet another embodiment of the invention.

FIG. 6E is an analog view illustrating a view angle distribution of a light source module having a single light guide plate in yet another embodiment of the invention.

FIG. 6F is an analog view illustrating a view angle distribution of a light source module having a single light guide plate in yet another embodiment of the invention.

FIG. 6G is an analog view illustrating a view angle distribution of a light source module having a single light guide plate in yet another embodiment of the invention.

FIG. 6H is an analog view illustrating a view angle distribution of a light source module having a single light guide plate in yet another embodiment of the invention.

DESCRIPTION OF THE EMBODIMENTS

In the following detailed description of the preferred embodiment, reference is made to the accompanying drawings which form a part hereof, and in which are shown by way of illustration specific embodiment in which the invention may be practiced. In this regard, the directional terminologies, such as "top", "bottom", "left", "right", "front", or "back", etc., are used with reference to the orientation of the Figure(s) being described. Accordingly, the drawings and descriptions will be regarded as illustrative in nature and not as restrictive.

Figure 1A:
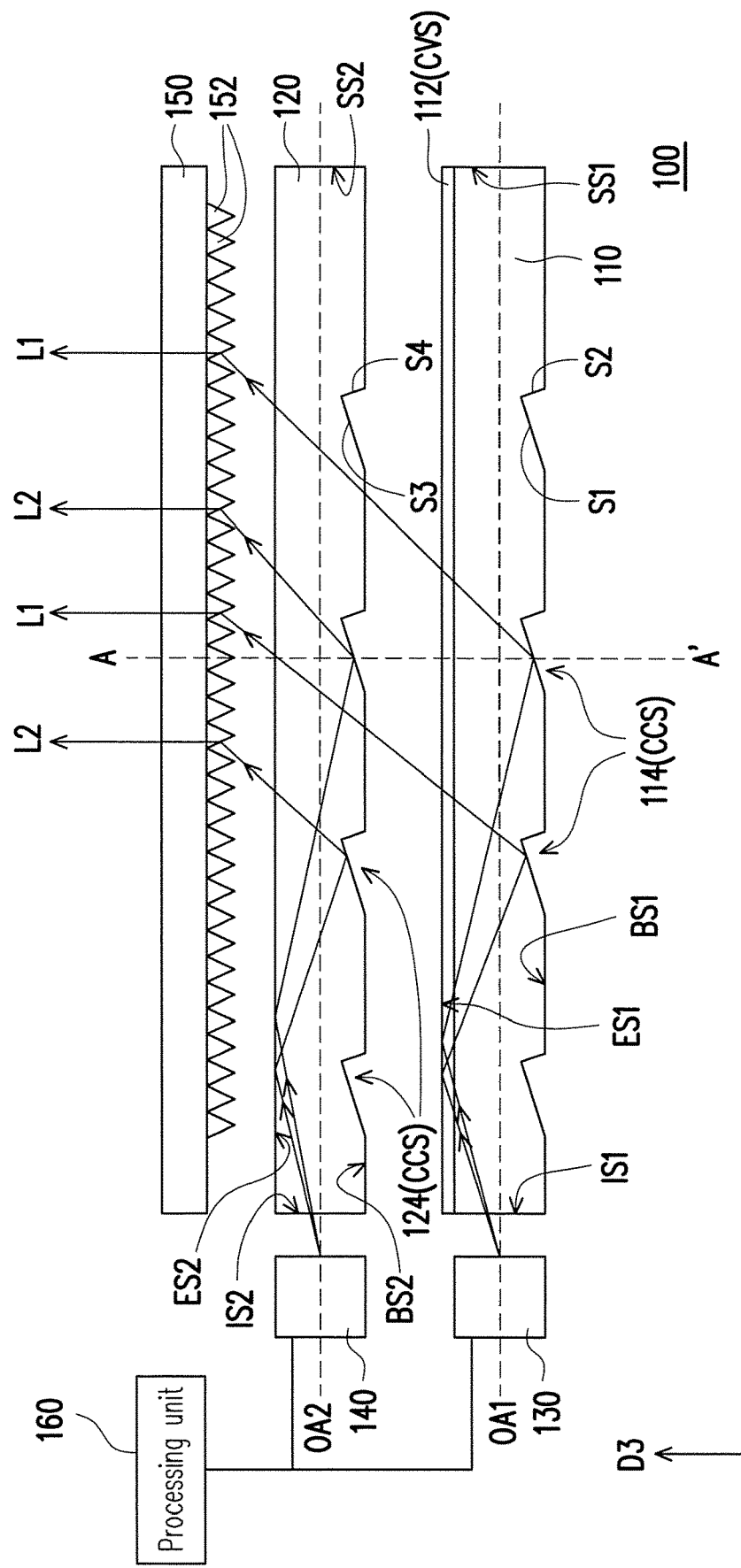
FIG. 1A is a cross-sectional schematic view illustrating a light source module of an embodiment of the invention.
Figure 1B:
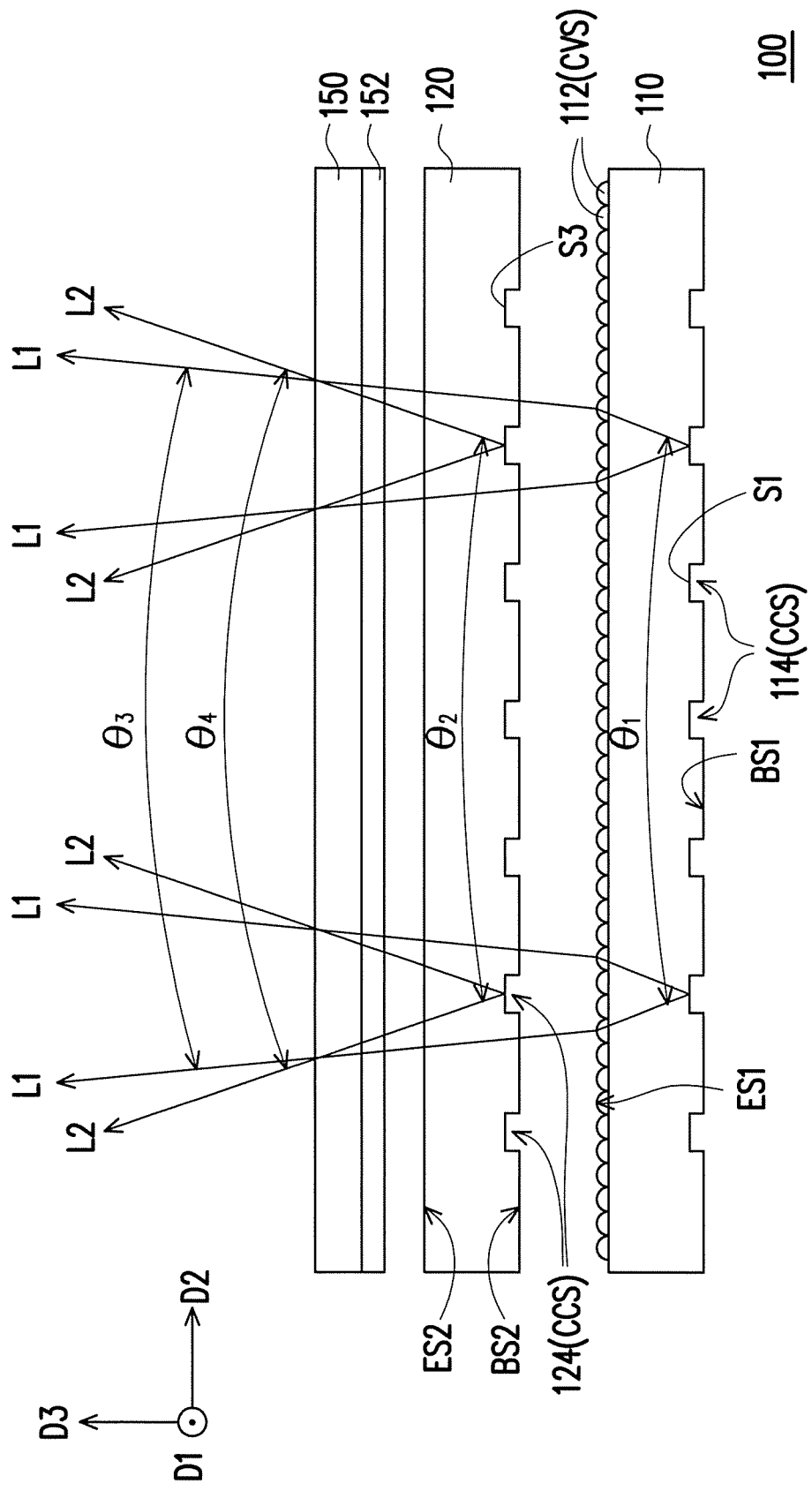
FIG. 1B is a cross-sectional schematic view of the light source module of the embodiment in FIG. 1A along a section line A-A'.

FIG. 1A is a cross-sectional schematic view illustrating a light source module of an embodiment of the invention, FIG. 1B is a cross-sectional schematic view of the light source module of the embodiment in FIG. 1A along a section line A-A', referring to FIG. 1A and FIG. B. In the embodiment, the light source module 100 includes a first light guide plate 110, a second light guide plate 120, a first light source 130, a second light source 140, and a turning film 150. The first light guide plate 110 and the second light guide plate 120 are sequentially stacked up, and the second light guide plate 120 is disposed between the first light guide plate 110 and the turning film 150. In addition, the first light source 130 is disposed beside the first light guide plate 110, and the second light source 140 is disposed beside the second light guide plate 120. To be more specific, the first light guide plate 110 includes a first light exiting surface ES1, a first bottom surface BS1, a first light incident surface IS1 connected to the first light exiting surface ES1 and the first bottom surface BS1, and a first side surface SS1 opposite the first light incident surface IS1. The first bottom surface BS1 and the first light exiting surface ES1 are located at two opposite sides of the first light guide plate 110.

Moreover, in the embodiment, the second light guide plate 120 includes a second light exiting surface ES2, a second bottom surface BS2, a second light incident surface IS2 connected to the second light exiting surface ES2 and the second bottom surface BS2, and a second side surface SS2 opposite the second light incident surface IS2. The second bottom surface BS2 and the second light exiting surface ES2 are located at two opposite sides of the second light guide plate 120. In the embodiment, the second bottom surface BS2 and the first light exiting surface ES1 are disposed adjacent to each other, and the second bottom surface BS2 faces the first light exiting surface ES1. Specifically, in the embodiment, there is not an optical film existing between the first light guide plate 110 and the second light guide plate 120. However, in some embodiments, an optical film may be disposed between the first light guide plate 110 and the second light guide plate 120 according to actual optical requirements, the invention is not limited thereto.

Referring to FIG. 1A again, in the embodiment, a light beam emitted by the first light source 130 enters the first light guide plate 110 via the first light incident surface IS1, and a light beam emitted by the second light source 140 enters the second light guide plate 120 via the second light incident surface IS2. To be more specific, the first light source 130 and the second light source 140 respectively have an optical axis OA1 and an optical axis OA2 parallel to each other. The light source module 100 is, for example, located in a space formed by a first direction D1, a second direction D2, and a third direction D3, wherein the second direction D2 is parallel to the optical axis OA1 and also parallel to the optical axis OA2. Otherwise, the second light guide plate 120 and the first light guide plate 110 are sequentially arranged, and the arranging direction is parallel to the third direction D3. The direction D2 is extended along the horizontal direction, and the third direction D3 is perpendicular to the direction D2 and extended along the vertical direction. In addition, the first direction D1 is perpendicular to both the second direction D2 and the third direction D3. In the embodiment, the first light source 130 and the second light source 140 are, for example, a plurality of Light-Emitting Diodes (LED), and the LEDs are arranged along the first direction D1. However, in other embodiments, the first light source 130 and the second light source 140 may also adopt Organic Light Emitting Diode (OLED) or other appropriate types of light emitting elements according to the optical requirements of the light source module 100, the invention is not limited thereto.

In the embodiment, at least one of the first bottom surface BS1 of the first light guide plate 110 and the second bottom surface BS2 of the second light guide plate 120 has a plurality of bottom surface micro-structures. To be more specific, the first bottom surface BS1 has a plurality of first bottom surface micro-structures 114, and each of the first bottom surface micro-structures 114 is a concave structure CCS. The concave structure CCS of each of the first bottom surface micro-structures 114 has a first surface S1 and a second surface S2 connected to each other, and each first surface S1 faces the first light source 130. Otherwise, the second bottom surface BS2 has a plurality of second bottom surface micro-structures 124, and each of the second bottom surface micro-structures 124 is also a concave structure CCS. The concave structure CCS of each of the second bottom surface micro-structures 124 has a first surface S3 and a second surface S4 connected to each other, and each first surface S3 faces the second light source 140. Specifically, the shapes of the first light guide plate 110 and the second light guide plate 120 are the same as or similar to each other, and the first bottom surface micro-structures 114 are the same as or similar to the second bottom surface micro-structures 124. In other embodiments, as shown in FIG. 1L, each of the first bottom surface micro-structures 114 or the second bottom surface micro-structures 124 may also be a convex structure CVS, each convex structure CVS has a first surface S1 (or S3) and a second surface S2 (or S4) connected to each other, and each first surface S1 (or S3) faces the first light source 130 (or the second light source 140). Otherwise, as shown in FIG. 1M for an instance, the first bottom surface micro-structures 114 may be different from the second bottom surface micro-structures 124, but the invention is not limited thereto.

In the embodiment, a light beam L1 emitted by the first light source 130 enters the first light guide plate 110 via the first light incident surface IS1. The light beam L1 is transmitted by total reflection in the first light guide plate 110. When the light beam L1 is transmitted to the first bottom surface micro-structures 114, the light beam L1 is reflected on the first surfaces S1 of the first bottom surface micro-structures 114 and refracted at the first light exiting surface ES1 to outside the first light guide plate 110. To be more specific, since the first surface S1 and the second surface S2 of each of the first bottom surface micro-structures 114 are flat surfaces, the light beam is not scattered by the first bottom surface micro-structures 114. Similarly, a light beam L2 emitted by the second light source 140 enters the second light guide plate 120 via the second light incident surface IS2. When the light beam L2 is transmitted to the second bottom surface micro-structures 124 by total reflection, the light beam L2 is reflected on the first surfaces S3 of the second bottom surface micro-structures 124 and refracted at the second light exiting surface ES2 to outside the second light guide plate 120. In some embodiments, a reflecting element may be disposed at a side of the first bottom surface BS1 of the first light guide plate 110. In these embodiments, even if the light beam is not transmitted by total reflection in the light guide plate (for example, the incident angle of the light beam on the bottom surface is smaller than the critical angle), the light beam is still reflected to the corresponding light exiting surface with the support of the reflecting element.

In the embodiment, the turning film 150 is, for example, a reverse prism sheet having a plurality of prism columns 152 arranged along a direction, the prism columns 152 face the second light exiting surface ES2 of the second light guide plate 120, and the reverse prism sheet is used to guide the light beam entering the reverse prism sheet with a large incident angle to exit toward the normal direction (with a smaller angle of refraction) and used to guide the light beam entering the reverse prism sheet with a small incident angle or in the normal direction to exit with a larger angle of refraction. The light beam has the incident angle between the normal direction (or small angle) and the large angle is reflected by the surface of the reverse prism sheet or is reflected inside the reverse prism sheet. In some embodiments, the turning film 150 adopts, for example, a reverse prism sheet, a positive prism sheet, or other types of the prism sheets, the invention is not limited thereto. Otherwise, according to optical, a diffusion sheet may be disposed above the second light guide plate 120 in the light source module 100. The diffusion sheet is configured to make the light beam L1 and the light beam L2 exit more uniformly, such that the light source module 100 has a good optical effect. In a different way, the light source module 100 may also include other types of optical sheets to make appropriate optical adjustments to the light beam L1 and the light beam L2. Otherwise, the light source module 100 may include other types of optical sheets disposed between the first light guide plate 110 and the second light guide plate 120 so as to prevent the mutual adhesion phenomenon from occurring between the first light guide plate 110 and the second light guide plate 120, the invention is not limited thereto.

Figure 1C:
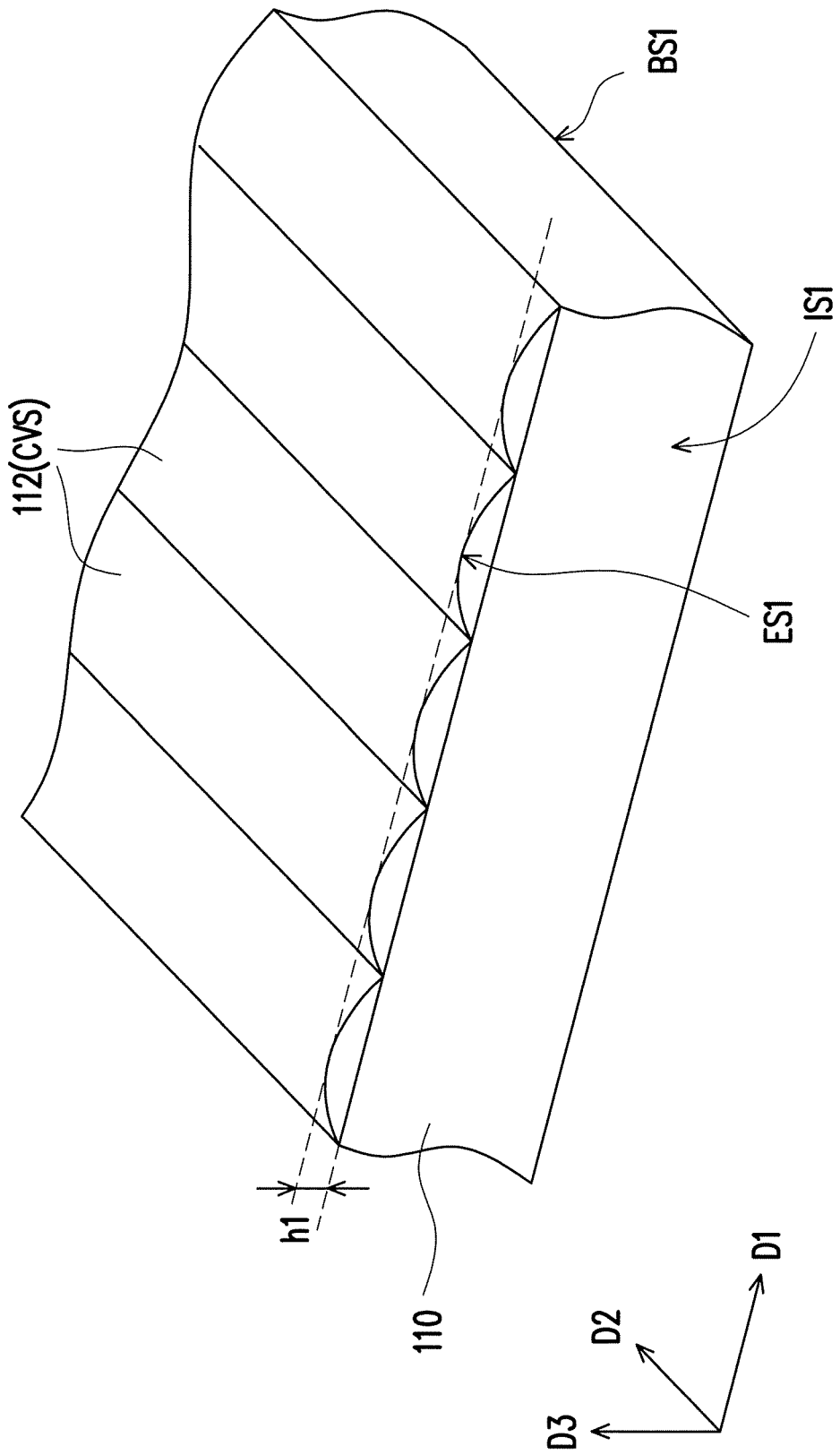
FIG. 1C is a three-dimensional schematic view of a part of a first light guide plate of the light source module of the embodiment in FIG. 1A.

FIG. 1C is a three-dimensional schematic view of a part of the first light guide plate of the light source module of the embodiment in FIG. 1A, referring to FIG. 1C with reference to FIG. 1A and FIG. 1B. In the embodiment, the first light exiting surface ES1 is located at a side of the first light guide plate 110 facing the turning film 150 and has a plurality of lenticular lens structures 112. The lenticular lens structures 112 are arranged along the first direction D1, and the lenticular lens structures 112 are extended along the second direction D2. To be more specific, the lenticular lens structures 112 are convex structures CVS, and the surface of each of the lenticular lens structures 112 is an arc-shaped surface. After being reflected at the first bottom surface micro-structures 114, the light beam L1 is refracted by the lenticular lens structures 112 to outside the first light guide plate 110. Furthermore, a part having a larger angle of incidence of the light beam L1 on the third direction D3 may be converted by the lenticular lens structures 112 to exit with a smaller angle of refraction or to exit in the normal direction.

Next, referring to FIG. 1B, in order to clearly show the light divergence angle of the light beam, FIG. B only shows the boundary of the light beam L1 exiting from the first light exiting surface ES1 on the first direction D1 as an example and only shows the boundary of the light beam L2 exiting from the second light exiting surface ES2 on the first direction D1 as an example. In the embodiment, after the light beam L1 is reflected by the first bottom surface micro-structures 114, the entire light divergence angle of the light beam L1 on the first direction D1 is a light divergence angle $\theta_1$. After the light beam L2 is reflected by the second bottom surface micro-structures 124, the entire light divergence angle of the light beam L2 on the first direction D1 is a light divergence angle $\theta_2$. Specifically, the light divergence angle $\theta_1$ is the same as the light divergence angle $\theta_2$. Next, the light beam L1 exits from the first light exiting surface ES1 via the lenticular lens structures 112, and a part having a larger angle of incidence of the light beam L1 on the third direction D3 may be converted by the lenticular lens structures 112 to exit with a smaller angle of refraction or to exit in the normal direction, so as to reduce the entire light divergence angle on the third direction D3 of the light beam L1 to the light divergence angle $\theta_3$. In contrast, after exiting the second light exiting surface ES2, the light beam L2 does not pass through the lenticular lens structures. Therefore, the entire light divergence angle of the light beam L2 exiting from the second light exiting surface ES2 on the third direction D3 (a direction perpendicular to the first light exiting surface ES1 and the second light exiting surface ES2) is a light divergence angle $\theta_4$, and the light divergence angle $\theta_3$ is smaller than the light divergence angle $\theta_4$.

Referring to FIG. 1C again, in the embodiment, the lenticular lens structures 112 have the same height h1 and the same curvature radius. The lenticular lens structures 112 may be designed to have appropriate height h1 and curvature radius according to actual and optical requirements. In some embodiments, the surfaces of the lenticular lens structures 112 may also have a prismatic shape or other shapes. Otherwise, the lenticular lens structures 112 may be concave structures curved inward the first light exiting surface ES1. In addition, according to the actual optical requirements, the lenticular lens structures 112 are disposed throughout the entire first light exiting surface ES1, or the lenticular lens structures 112 are not disposed throughout the entire first light exiting surface ES1, the invention is not limited thereto. Moreover, in other embodiments, the height and the curvature radius of the lenticular lens structures 112 may be appropriately adjusted, for example, the height of the lenticular lens structures 112 may be gradually changed on the first direction D1. Besides, in other embodiments, the second light exiting surface ES2 of the second light guide plate 120 may also have lenticular lens structures similar to the lenticular lens structures 112, the invention is not limited thereto.

Figure 1D:
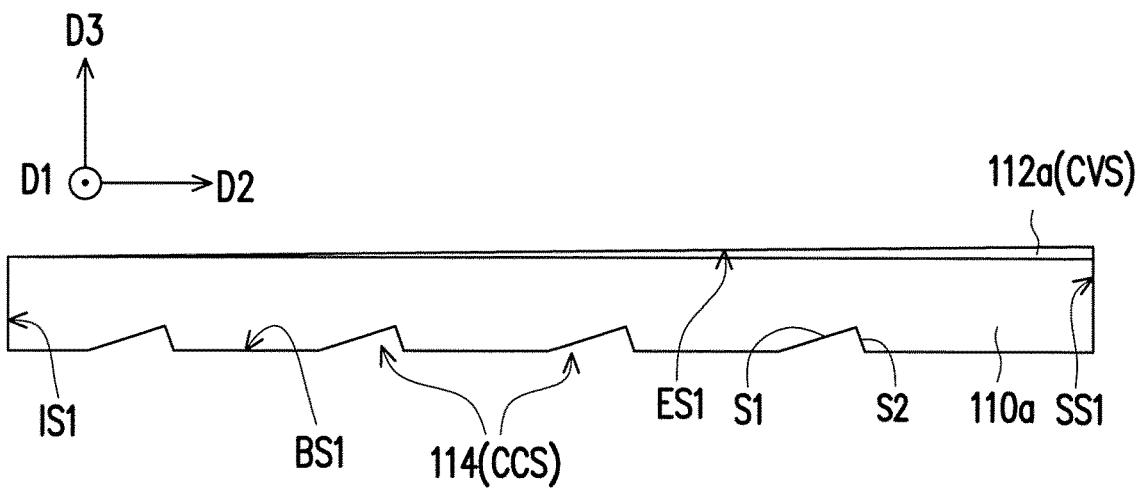
FIG. 1D to FIG. 1F are cross-sectional schematic views illustrating lenticular lens structures being disposed at the first light guide plate in some embodiments of the invention.
Figure 1E:
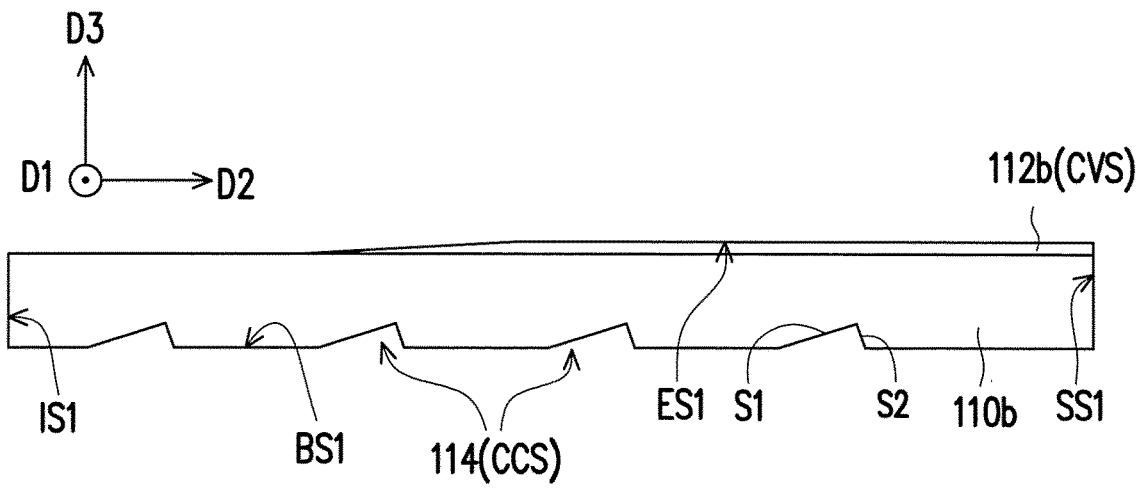
Figure 1F:
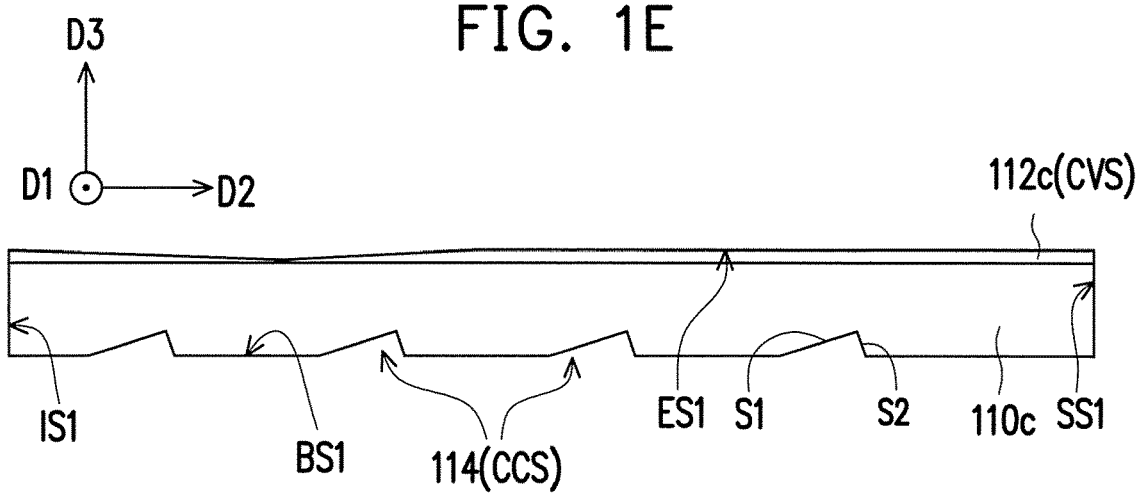

FIG. 1D to FIG. 1F are cross-sectional schematic views illustrating lenticular lens structures being disposed at the first light guide plate in some embodiments of the invention, referring to FIG. 1D to FIG. 1F. As shown in the embodiment in FIG. 1A, the height of the lenticular lens structures 112 is, for example, constant along the second direction D2. However, the height of the lenticular lens structures 112 along the second direction D2 may be adjusted according to design requirements. In the embodiment in FIG. 1D, the height of each of the lenticular lens structures 112a of the first light guide plate 110a may be gradually changed, for example, the height of each of the lenticular lens structures 112a is gradually increased along a direction from a side of the first light incident surface IS1 to a side away from the first light incident surface IS1 (such as the second direction D2). Otherwise, in the embodiment in FIG. 1E, the height of only a part of each of the lenticular lens structures 112b of the first light guide plate 110b is gradually changed. For example, the height of each of the lenticular lens structures 112b is gradually increased along a direction from a side of the first light incident surface IS1 to a side away from the first light incident surface IS1 (such as the second direction D2) and remained constant after reaching a certain height. Otherwise, in the embodiment in FIG. 1F, the height of each of the lenticular lens structures 112c of the first light guide plate 110c is gradually changed in many different segments. For example, along a direction from a side of the first light incident surface IS1 to a side away from the first light incident surface IS1 (such as the second direction D2), the height of each of the lenticular lens structures 112c of the first light guide plate 110c is gradually decreased to a certain height and then is gradually increased and remained constant after reaching a certain height. To be more specific, the height difference of each of the lenticular lens structures is only considered as some embodiments, the invention is not limited thereto.

Figure 1G:
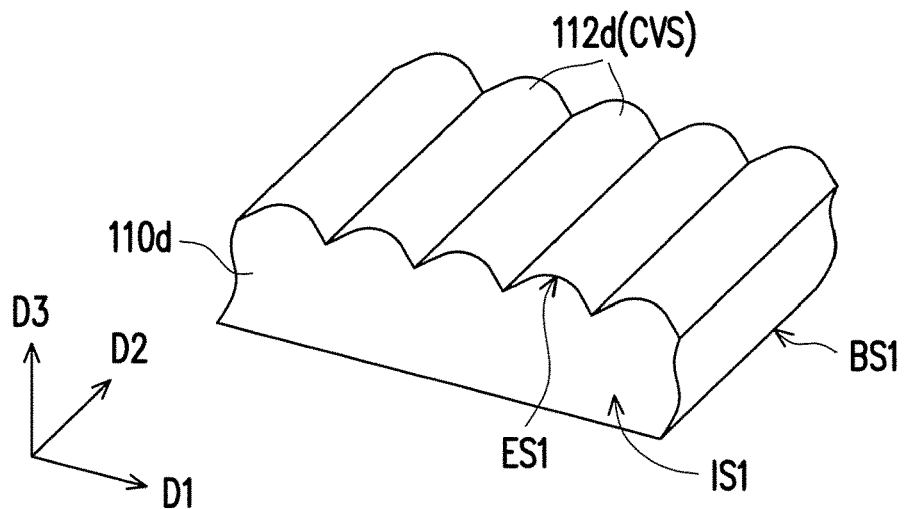
FIG. 1G to FIG. 1I are cross-sectional schematic views illustrating lenticular lens structures in some embodiments of the invention.
Figure 1H:
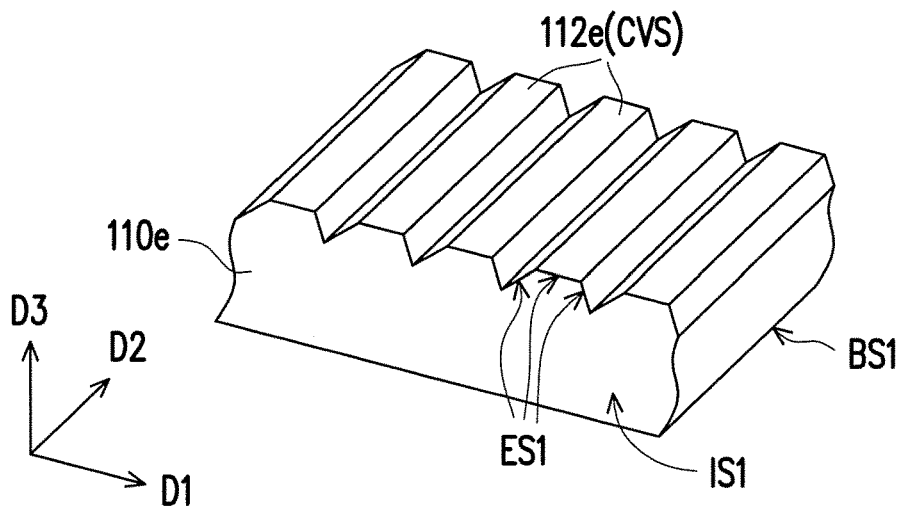
Figure 1I:
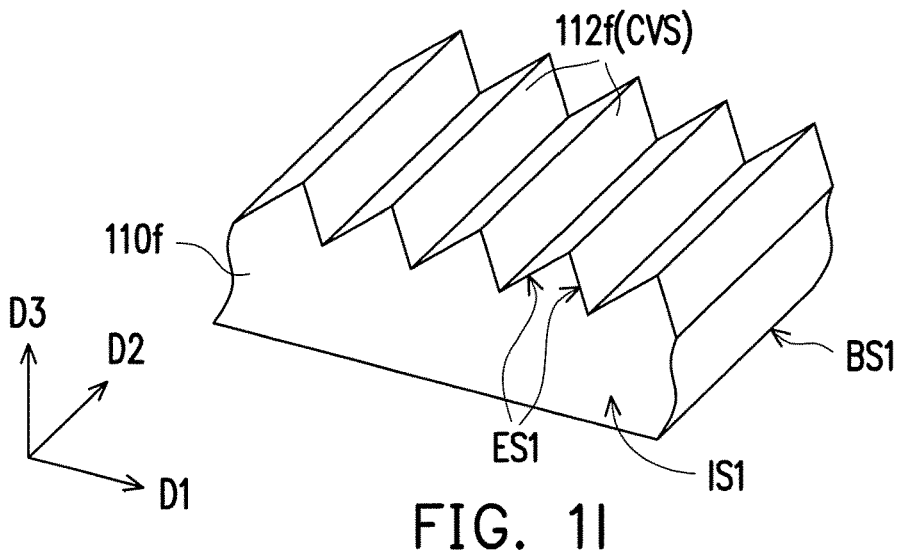

FIG. 1G to FIG. 1I are cross-sectional schematic views illustrating lenticular lens structures in some embodiments of the invention, referring to FIG. 1G to FIG. 1I. To be more specific, the cross sections of the lenticular lens structures in these embodiments are parallel to the plane constructed by the first direction D1 and the third direction D3. In these embodiments, the shapes of the lenticular lens structures are not limited to arc-shape. In the embodiment in FIG. 1G, the shape of the cross section of each of the lenticular lens structures 112d is a shape formed by an arc shape connected to two ladder-shaped side edges. In the embodiment in FIG. 1H, the cross section of each of the lenticular lens structures 112e has a ladder shape. Moreover, in the embodiment in FIG. 1I, the cross section of each of the lenticular lens structures 112f has a zigzag shape. For example, the three-dimensional shape of each of the lenticular lens structures 112f is a prismatic shape. In other embodiments of the invention, the shape of the lenticular lens structure may be designed according to actual optical requirements, the invention is not limited thereto.

Referring to FIG. 1A, in the embodiment, the light source module 100 further includes a processing unit 160. The processing unit 160 is configured to control the first light source 130 and the second light source 140. For example, the light source module 100 may have a wide viewing angle mode and an anti-spy mode. When the light source module 100 is in the wide viewing angle mode, the processing unit 160 controls the second light source 140 to emit light and controls the first light source 130 to not emit light. At this time, the light exiting the light source module 100 is the light beam L2 having a light divergence angle suitable for normal use along the horizontal direction (the first direction D1). Moreover, when the light source module 100 is in the anti-spy mode, the processing unit 160 controls the first light source 130 to emit light and controls the second light source 140 to not emit light. At this time, the light exiting the light source module 100 is the light beam L1. Since the entire light divergence angle $\theta_3$ of the light beam L1 along the horizontal direction is smaller than the entire light divergence angle $\theta_4$ of the light beam L2 along the horizontal direction, the light exiting from the light source module 100 in the anti-spy mode has a smaller light divergence angle along the horizontal direction. In other words, when the user views the products that the light source module 100 is applied to, such as viewing the display apparatus of the mobile phone, only the user in a range of a small angle with respect to a direction perpendicular to the display of the display apparatus may view the displayed contents of the display apparatus.

That is to say, in the anti-spy mode, the user may view the displayed contents of the display apparatus. However, when the locations of other people exceed a certain angle with respect to a direction perpendicular to the display of the display apparatus, the exiting light provided by the light source module 100 may not enters the eyes of those other people, thus other people cannot view the displayed contents of the display apparatus so that the display apparatus has the anti-spy effect. Otherwise, in the wide viewing angle mode, since the exiting light of the light source module 100 on the horizontal direction has a light divergence angle suitable for normal use, the user in a range of a larger angle with respect to a direction perpendicular to the display of the display apparatus may view the displayed contents of the display apparatus.

In the embodiment, via the control of the processing unit 160, the user may optionally select to use the anti-spy mode or the wide viewing angle mode, so as to further achieve convenience in use. Moreover, in the embodiment, according to actual requirements, when the light source module 100 is in the wide viewing angle mode or the anti-spy mode, the processing unit 160 may control the first light source 130 and the second light source 140 different from each other. For example, the processing unit 160 may control the first light source 130 and the second light source 140 to emit light in the wide viewing angle mode, such that the exiting light of the light source module 100 on the horizontal direction has a light divergence angle suitable for normal use, and since the first light source 130 is used simultaneously to enhance the brightness of the light in the normal direction, the central of the light exiting surface of the prism sheet has a higher brightness. Otherwise, in the embodiment, under the circumstance that the first light source 130 and the second light source 140 identical with each other are adopted, the luminance value of the exiting light of the light source module 100 in the anti-spy mode is higher than the luminance value of the exiting light of the light source module 100 in the wide viewing angle mode. For example, the ratio of the luminance value of the exiting light of the light source module 100 in the anti-spy mode (the first light source 130 is used) to the luminance value of the exiting light of the light source module 100 in the wide viewing angle mode is 1.669, for instance. In some embodiments, the brightness of the exiting light of the first light source 130 may be appropriately reduced, such that the luminance value of the exiting light of the light source module 100 in the anti-spy mode is equal to the luminance value of the exiting light of the light source module 100 in the wide viewing angle mode. As a result, the user may not perceive the difference between the luminance value of the exiting light of the light source module 100 in the anti-spy mode and the luminance value of the exiting light of the light source module 100 in the wide viewing angle mode, and the light source module 100 in the anti-spy mode may achieve energy-saving effect, such as saving about 40%. Otherwise, in the embodiment, there is no need for an additional optical sheet disposed between the first light guide plate 110 and the second light guide plate 120, thus the cost of the light source module 100 is reduced.

Figure 1K:
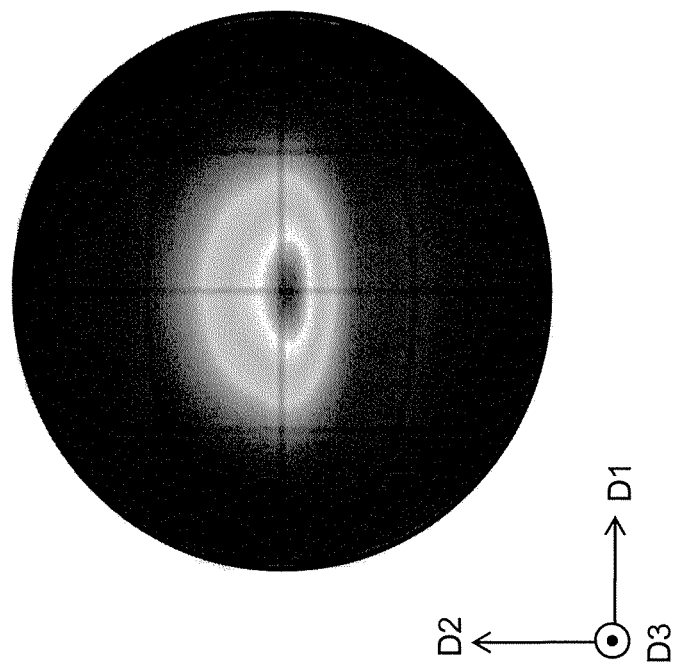
FIG. 1K is an analog view illustrating a view angle distribution when the light source module of the embodiment in FIG. 1A is in an anti-spy mode.
Figure 1J:
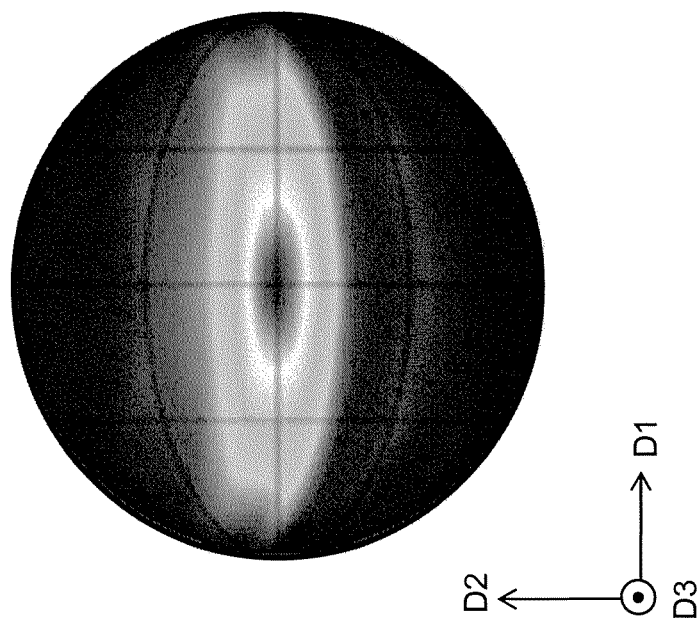
FIG. 1J is an analog view illustrating a view angle distribution when the light source module of the embodiment in FIG. 1A is in a wide viewing angle mode.
Figure 1L:
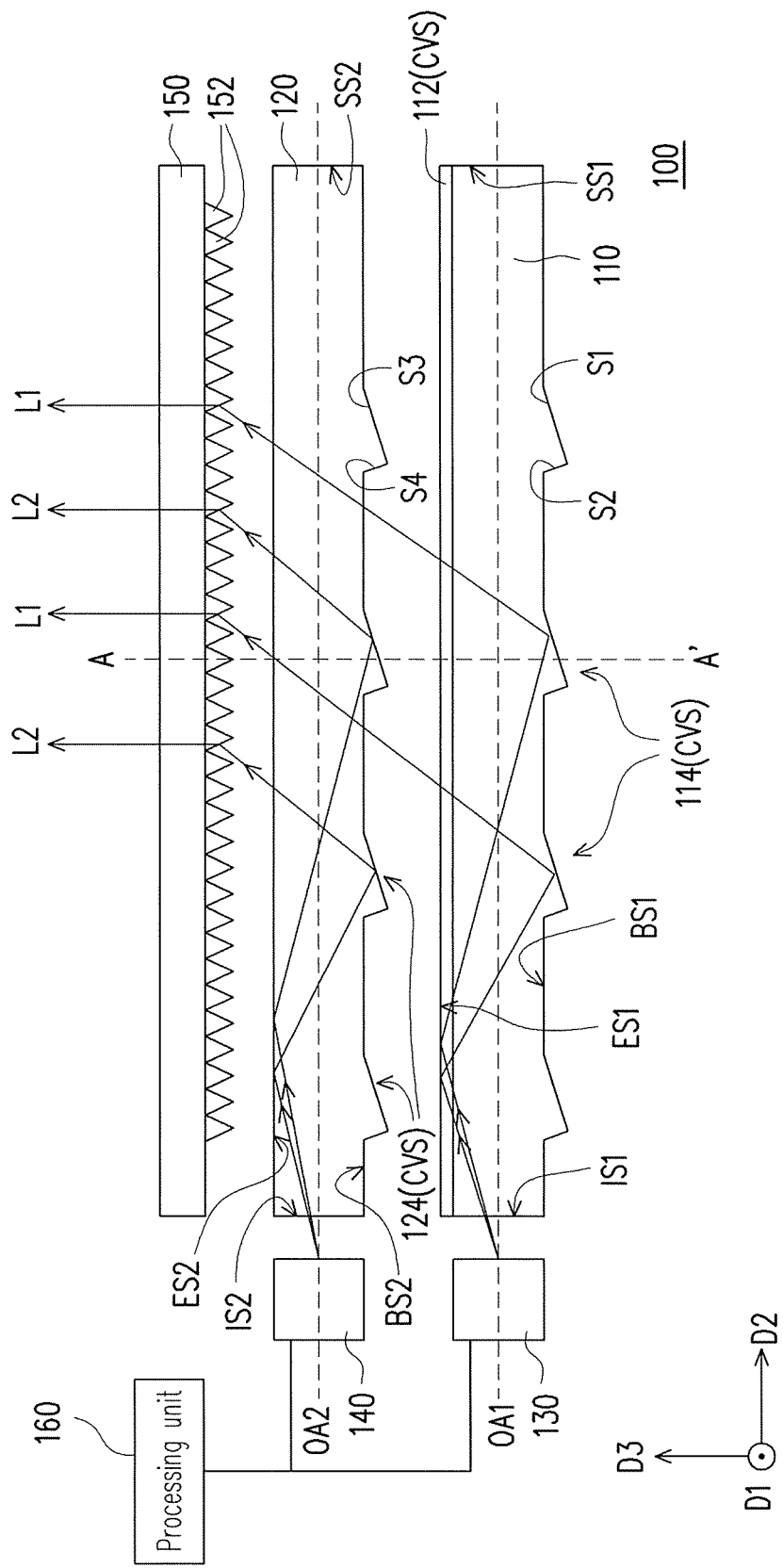
FIG. 1L is a cross-sectional schematic view illustrating each of a plurality first bottom surface micro-structures being a convex structure according to an embodiment of the invention.
Figure 1M:
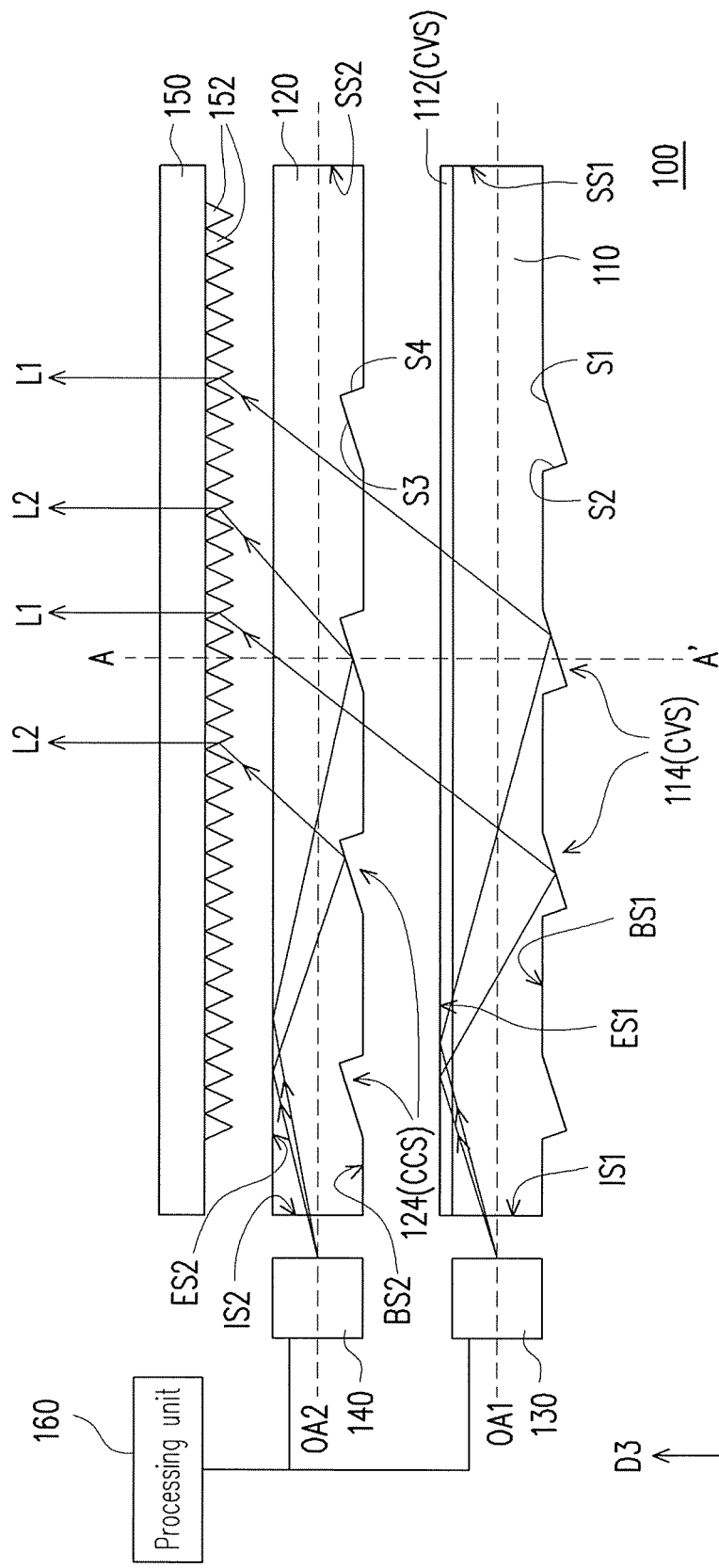
FIG. 1M is a cross-sectional schematic view illustrating each of a plurality second bottom surface micro-structures being a convex structure according to an embodiment of the invention.

FIG. 1J is an analog view illustrating a view angle distribution when the light source module of the embodiment in FIG. 1A is in the wide viewing angle mode, FIG. 1K is an analog view illustrating a view angle distribution when the light source module of the embodiment in FIG. 1A is in the anti-spy mode, referring to FIG. 1J and FIG. 1K. In the analogy results of the view angle distribution of the light source module of the embodiment in FIG. 1J and FIG. 1K, the different gray scale distribution represents the luminance value distribution at each view angle of the light source module 100. In the embodiment, the vertical view angle (the view angle on the second direction D2) of the light source module 100 in the wide viewing angle mode is, for example, 18.70 degrees (°), and the vertical view angle of the light source module 100 in the anti-spy mode is, for example, 19.28 degrees. In addition, the horizontal view angle (the view angle on the first direction D1) of the light source module 100 in the wide viewing angle mode is, for example, 64.07 degrees, and the horizontal view angle of the light source module 100 in the anti-spy mode is, for example, 34.78 degrees. It should be noted here, FIG. 1J to FIG. 1K are analog views illustrating the view angle distribution, and other analog Figures illustrating the view angle distribution and described hereinafter (FIG. 2B to FIG. 2C are analog views illustrating the view angle distribution, FIG. 3B to FIG. 3C are analog views illustrating the view angle distribution, FIG. 4B to FIG. 4C, and FIG. 6A to FIG. 6H are analog views illustrating the view angle distribution are analog views illustrating the view angle distribution) and the related analogy experimental data are only considered as some embodiments of the invention, the invention is not limited thereto. After one of ordinary skill in the art references to the invention, appropriate modifications may be made based on principles of the invention by changing parameters and settings, however such modifications are within the scope of the invention.

Figure 2A:
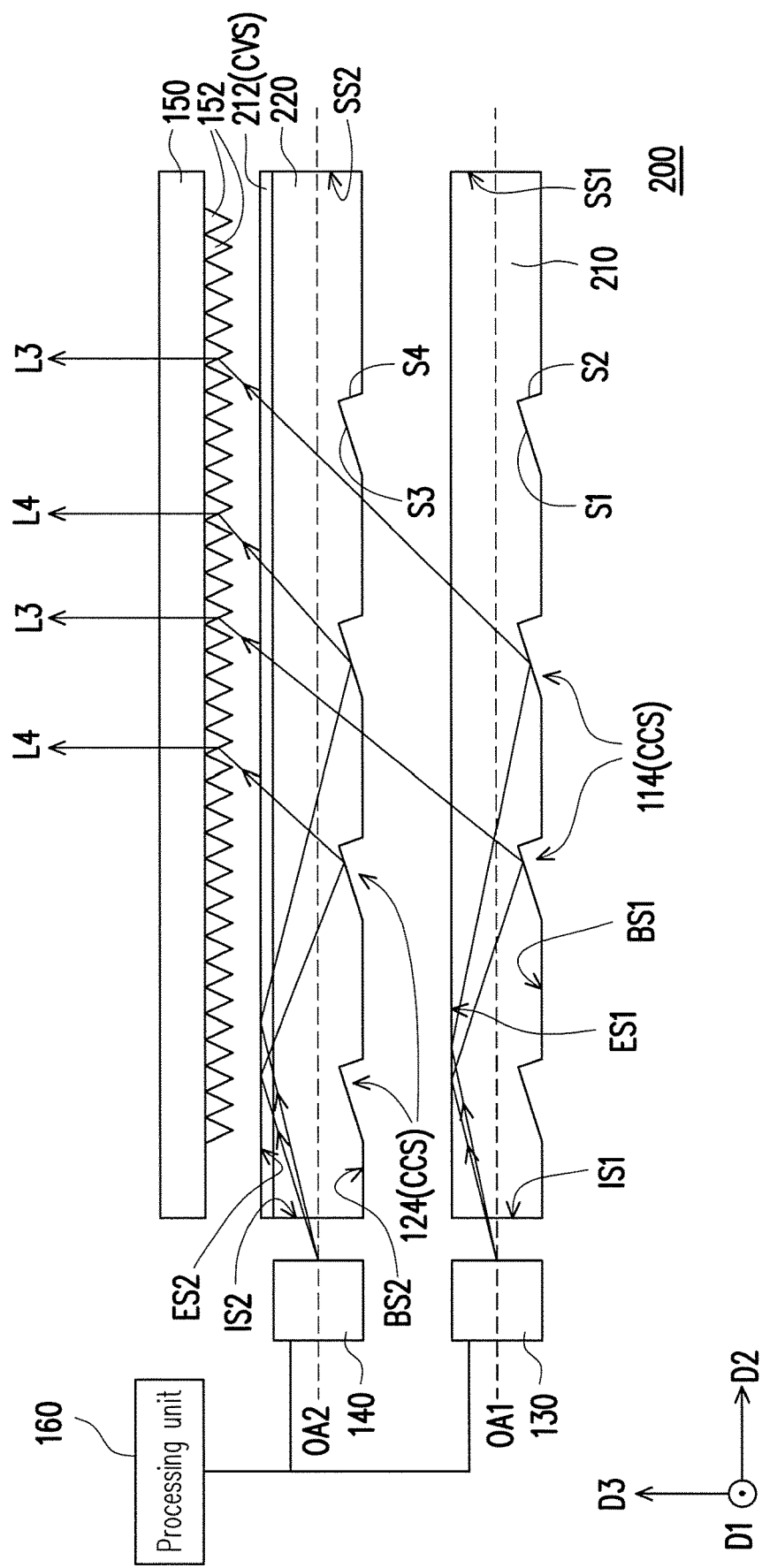
FIG. 2A is a cross-sectional schematic view illustrating a light source module of another embodiment of the invention.

FIG. 2A is a cross-sectional schematic view illustrating a light source module of another embodiment of the invention, referring to FIG. 2A. The light source module 200 is similar to the light source module 100 of the embodiment in FIG. 1A. The members and the related description of the light source module 200 may refer to the members and the related description of the light source module 100 of the embodiment in FIG. 1A, and will not be repeated. The differences between the light source module 200 and the light source module 100 are described as followings. In the embodiment, the second light exiting surface ES2 of the second light guide plate 220 has a plurality of lenticular lens structures 212, and the first light exiting surface ES1 of the first light guide plate 210 does not have the lenticular lens structures. To be more specific, the lenticular lens structures 212 are similar to the lenticular lens structures 112 of the embodiment in FIG. 1A. After a light beam L3 emitted from the first light source 130 is reflected at the first bottom surface micro-structures 114, the light beam L3 exits from the first light exiting surface ES1 to outside the first light guide plate 210. Otherwise, after a light beam L4 emitted from the second light source 140 is reflected at the second bottom surface micro-structures 124, the light beam L4 is refracted by the lenticular lens structures 212 to outside the second light guide plate 220. In the embodiment, the lenticular lens structures 212 reduces the entire light divergence angle on the first direction D1 of the light beam L4, such that the entire light divergence angle on the first direction D1 of the light beam L4 is smaller than the entire light divergence angle on the first direction D1 of the light beam L3. To be more specific, the light source module 200 in the embodiment may be similar to the light source module 100 as shown in FIG. 1A, so as to make the display apparatus have the anti-spy effect. In addition, the user may optionally select to use the anti-spy mode or the wide viewing angle mode, so as to further achieve convenience in use.

FIG. 2B is an analog view illustrating a view angle distribution when the light source module of the embodiment in FIG. 2A is in the anti-spy mode, FIG. 2C is an analog view illustrating a view angle distribution when the light source module of the embodiment in FIG. 2A is in the wide viewing angle mode, referring to FIG. 2B and FIG. 2C. In the analogy results of the view angle distribution of the light source module of the embodiment in FIG. 2B and FIG. 2C, the different color distribution represents the view angle distribution of the light source module 200. In the embodiment, the vertical view angle of the light source module 200 in the wide viewing angle mode is, for example, 20.18 degrees, and the vertical view angle of the light source module 200 in the anti-spy mode is, for example, 16.31 degrees. In addition, the horizontal view angle of the light source module 200 in the wide viewing angle mode is, for example, 48.43 degrees, and the horizontal view angle of the light source module 200 in the anti-spy mode is, for example, 35.26 degrees. As described in FIG. 1J, FIG. 1K, FIG. 2b, and FIG. 2C, the lenticular lens structures have an effect of reducing the divergence angle, thus the light guide plate configured to have the lenticular lens structures may be regarded as a light source element supplying the anti-spy mode and the light guide plate not configured to have the lenticular lens structures may be regarded as a light source element supplying the wide viewing angle mode. In comparison with the light source module 100, the light guide plate having the lenticular lens structures of the aforementioned light source module 200 is disposed as the top layer in the two light guide plates that are sequentially stacked up. When the light beam exits from the bottom layer which is the light guide plate serving as the light source element in the wide viewing angle mode and passes through the lenticular lens structures of the light exiting surface of the top layer which is the light guide plate serving as the light source element in the anti-spy mode, the light beam is affected by the lenticular lens structures so that the divergence angle on the first direction D1 is reduced, thus when the light source module 200 is in the wide viewing angle mode, the divergence angle on the first direction D1 of the light source module 200 is smaller than the divergence angle on the first direction D1 of the light source module 100. To be more specific, in the wide viewing angle mode, the first light exiting surface ES1, which is configured to have the lenticular lens structures of the first light guide plate 210 stacked below has a wider viewing angle, thus viewing angle difference is more obvious between the wide viewing angle mode and the anti-spy mode.

Figure 3A:
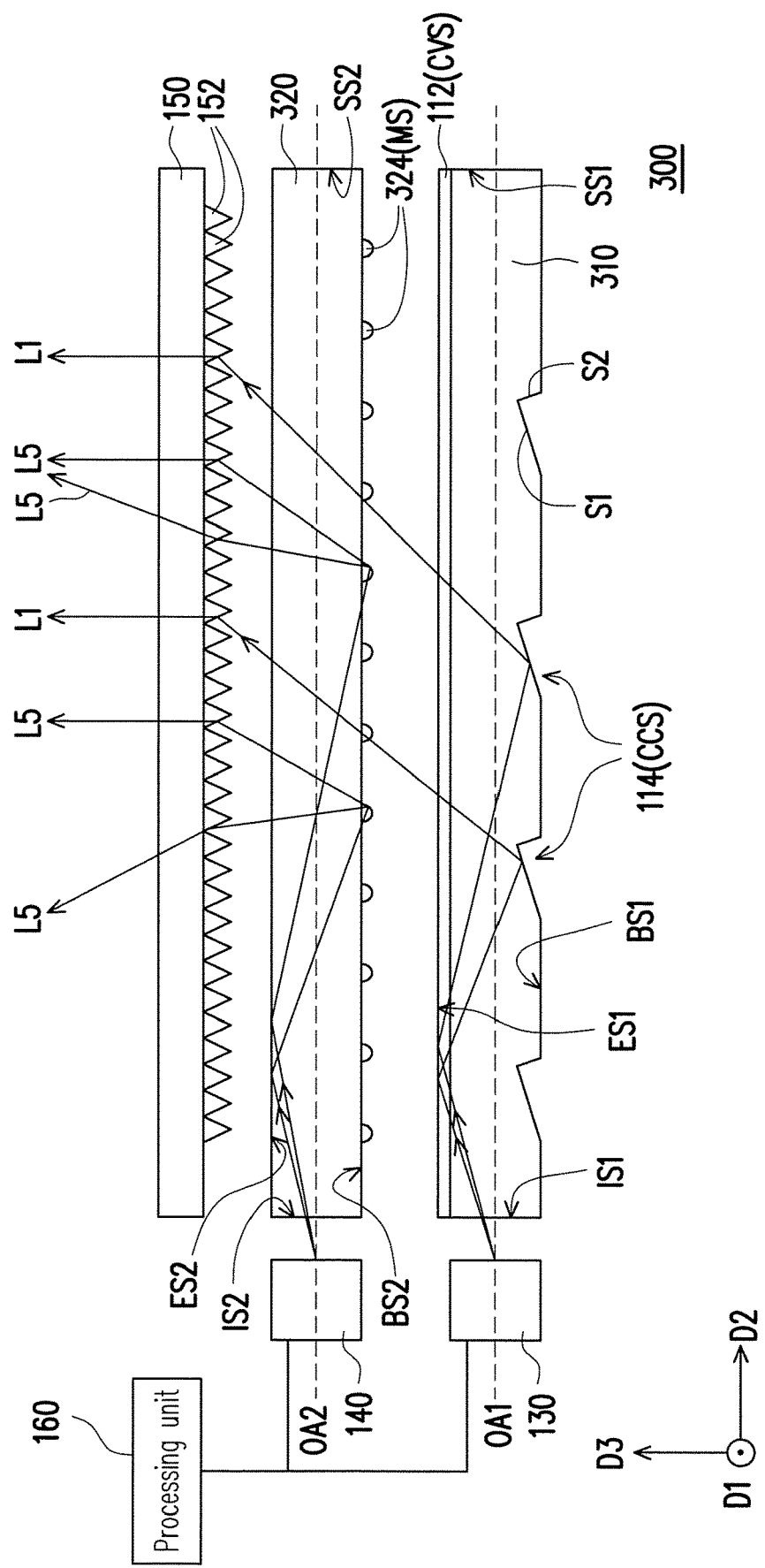
FIG. 3A is a cross-sectional schematic view illustrating a light source module of yet another embodiment of the invention.
Figure 3C:
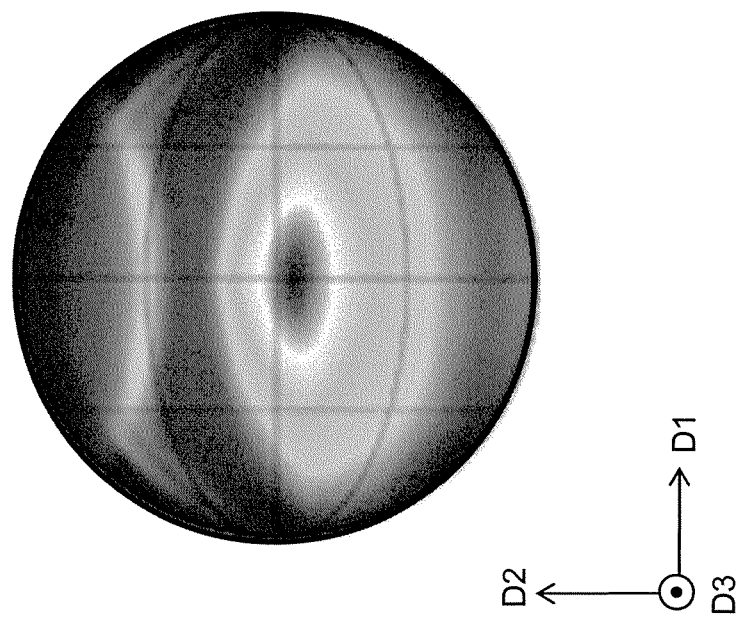
FIG. 3C is an analog view illustrating a view angle distribution when the light source module of the embodiment in FIG. 3A is in a wide viewing angle mode.
Figure 3B:
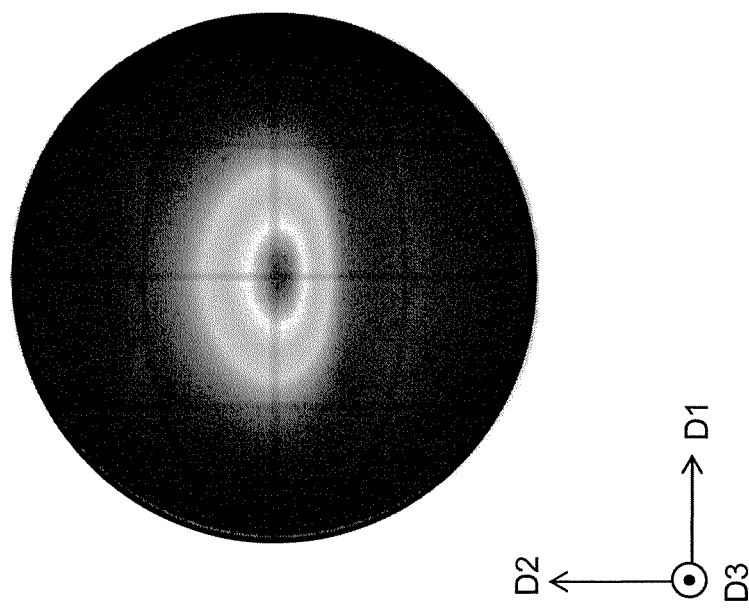
FIG. 3B is an analog view illustrating a view angle distribution when the light source module of the embodiment in FIG. 3A is in an anti-spy mode.

FIG. 3A is a cross-sectional schematic view illustrating a light source module of yet another embodiment of the invention, referring to FIG. 3A. The light source module 300 is similar to the light source module 100 of the embodiment in FIG. 1A. The members and the related description of the light source module 300 may refer to the members and the related description of the light source module 100 of the embodiment in FIG. 1A, and will not be repeated. The differences between the light source module 300 and the light source module 100 are described as followings. In the embodiment, the second bottom surface BS2 of the second light guide plate 320 has a plurality of second bottom surface micro-structures 324, and each of the second bottom surface micro-structures 324 is a scattering micro-structure MS. To be more specific, the light beam L5 emitted from the second light source 140 is transmitted in the second light guide plate 320 by total reflection. When being transmitted to the second bottom surface micro-structures 324, the light beam L5 is scattered by the second bottom surface micro-structures 324. At least a part being scattered of the light beam L5 exits from the second light exiting surface ES2 to outside the second light guide plate 320. In the embodiment, by the second bottom surface micro-structures 324, the entire light divergence angle of the light beam L5 on the first direction D1 is diverged, and the entire light divergence angle of the light beam L5 on the second direction D2 is also diverged. To be more specific, the entire light divergence angle of the light beam L1 on the first direction D1 is smaller than the entire light divergence angle of the light beam L5 on the first direction D1. Therefore, the light source module 300 in the embodiment may be similar to the light source module 100 as shown in FIG. 1A, so as to make the display apparatus have the anti-spy effect. In addition, the user may optionally select to use the anti-spy mode or the wide viewing angle mode, so as to further achieve convenience in use. In the embodiment, by comparison with the two aforementioned embodiments, the second bottom surface micro-structures 324 makes the light divergence angle on the second direction D2 of the light beam L5 diverge in the wide viewing angle mode, thus the difference between the light divergence angle on the second direction D2 in the anti-spy mode and the light divergence angle on the second direction D2 in the wide viewing angle mode is obvious, such that the embodiment may be switched between the anti-spy mode and the wide viewing angle mode on the second direction D2. In some embodiments, the second bottom surface micro-structures 324 (the scattering micro-structures MS) may be designed to have appropriate height and curvature radius according to actual optical requirements. Otherwise, in the embodiment, the second bottom surface micro-structures 324 are curved outward on the second bottom surface BS2. However, in other embodiments, the second bottom surface micro-structures 324 may also be curved inward on the second bottom surface BS2.

FIG. 3B is an analog view illustrating a view angle distribution when the light source module of the embodiment in FIG. 3A is in the anti-spy mode, FIG. 3C is an analog view illustrating a view angle distribution when the light source module of the embodiment in FIG. 3A is in the wide viewing angle mode, referring to FIG. 3B and FIG. 3C. In the analogy results of the view angle distribution of the light source module of the embodiment in FIG. 3B and FIG. 3C, the different color distribution represents the view angle distribution of the light source module 300. In the embodiment, the vertical view angle of the light source module 300 in the wide viewing angle mode is, for example, 33.92 degrees, and the vertical view angle of the light source module 300 in the anti-spy mode is, for example, 19.90 degrees. In addition, the horizontal view angle of the light source module 300 in the wide viewing angle mode is, for example, 51.84 degrees, and the horizontal view angle of the light source module 300 in the anti-spy mode is, for example, 34.41 degrees. As described in FIG. 1J, FIG. 1K, FIG. 3B, and FIG. 3C, the second bottom surface micro-structures 324 makes the light divergence angle on the second direction D2 of the light beam L5 diverge. By comparison with the light source module 100, in the aforementioned light source module 300, when the light beam L5 is transmitted to the second bottom surface micro-structures 324 in the second light guide plate 320 located at the top layer, the second bottom surface micro-structures 324 make the light beam L5 diverge and then make the divergence angle on the second direction D2 diverge, thus the divergence angle on the second direction D2 of the light source module 300 in the wide viewing angle mode is larger than the divergence angle on the second direction D2 of the light source module 100 in the wide viewing angle mode. To be more specific, when the second bottom surface BS2 configured to have the second bottom surface micro-structures 324 of the second light guide plate 320 stacked above is in the wide viewing angle mode, the viewing angle on the second direction D2 is wider, thus viewing angle difference is more obvious between the wide viewing angle mode and the anti-spy mode. The first light source 130 and the second light source 140 of the light source modules 100, 200, and 300 of the aforementioned embodiments are not limited to being disposed at the same side, and may be disposed at different sides.

Figure 4A:
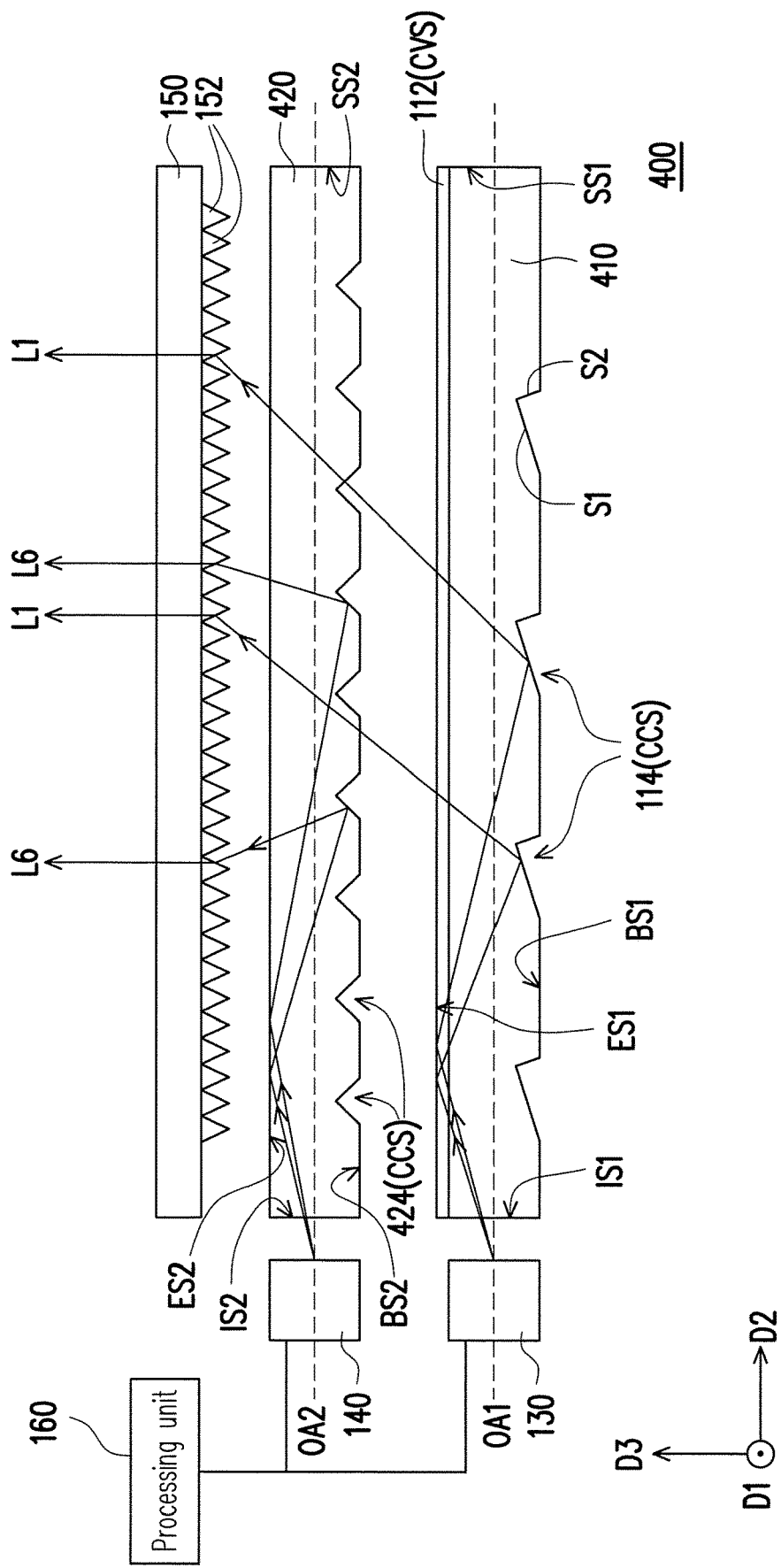
FIG. 4A is a cross-sectional schematic view illustrating a light source module of yet another embodiment of the invention.

FIG. 4A is a cross-sectional schematic view illustrating a light source module of yet another embodiment of the invention, referring to FIG. 4A. The light source module 400 is similar to the light source module 100 of the embodiment in FIG. 1A. The members and the related description of the light source module 400 may refer to the members and the related description of the light source module 100 of the embodiment in FIG. 1A, and will not be repeated. The differences between the light source module 400 and the light source module 100 are described as followings. In the embodiment, the second bottom surface BS2 of the second light guide plate 420 has a plurality of second bottom surface micro-structures 424, and each of the second bottom surface micro-structures 424 is a concave structure CCS, such as having a V-cut shape (V-shaped notch). To be more specific, the surface of the second bottom surface micro-structure 424 is a prism face. After a light beam L6 emitted from the second light source 140 is reflected at the second bottom surface micro-structures 424, the light beam L6 exits from the second light exiting surface ES2 to outside the second light guide plate 420. By the second bottom surface micro-structures 424, the entire light divergence angle on the first direction D1 of the light beam L6 is diverged, and the entire light divergence angle of the light beam L6 on the second direction D2 is also diverged. To be more specific, the entire light divergence angle of the light beam L1 on the first direction D1 is smaller than the entire light divergence angle of the light beam L6 on the first direction D1. Therefore, the light source module 400 in the embodiment may be similar to the light source module 100 as shown in FIG. 1A, so as to make the display apparatus have the anti-spy effect. In addition, the user may optionally select to use the anti-spy mode or the wide viewing angle mode, so as to further achieve convenience in use.

Figure 4C:
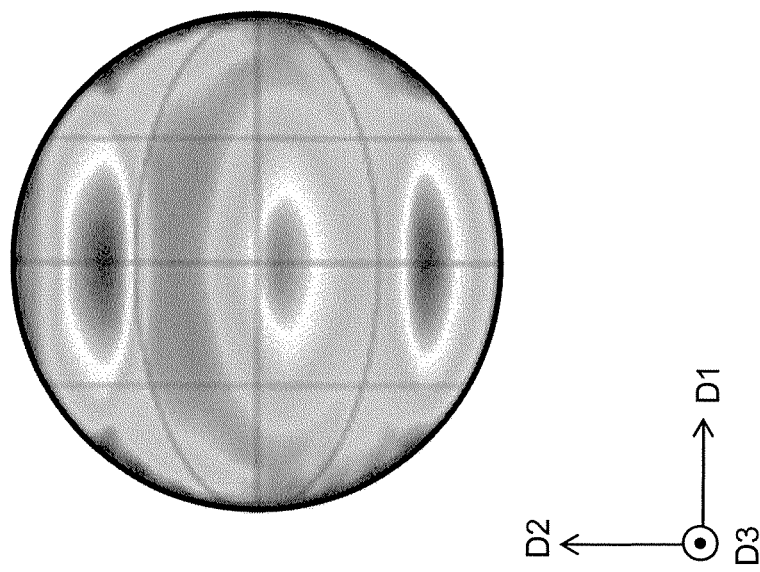
FIG. 4C is an analog view illustrating a view angle distribution when the light source module of the embodiment in FIG. 4A is in a wide viewing angle mode.
Figure 4B:
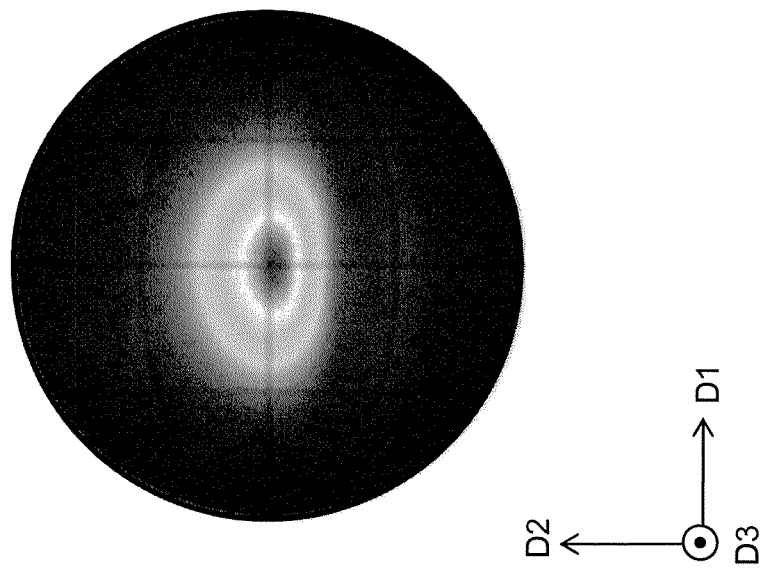
FIG. 4B is an analog view illustrating a view angle distribution when the light source module of the embodiment in FIG. 4A is in an anti-spy mode.

FIG. 4B is an analog view illustrating a view angle distribution when the light source module of the embodiment in FIG. 4A is in the anti-spy mode, FIG. 4C is an analog view illustrating a view angle distribution when the light source module of the embodiment in FIG. 4A is in the wide viewing angle mode, referring to FIG. 4B and FIG. 4C. In the analogy results of the view angle distribution of the light source module of the embodiment in FIG. 4B and FIG. 4C, the different color distribution represents the view angle distribution of the light source module 400. In the embodiment, the vertical view angle of the light source module 400 in the wide viewing angle mode is, for example, 61.27 degrees, and the vertical view angle of the light source module 400 in the anti-spy mode is, for example, 19.38 degrees. In addition, the horizontal view angle of the light source module 400 in the wide viewing angle mode is, for example, 78.63 degrees, and the horizontal view angle of the light source module 400 in the anti-spy mode is, for example, 33.71 degrees. As described in FIG. 1J, FIG. 1K, FIG. 4B, and FIG. 4C, the second bottom surface micro-structures 424 make the light divergence angle on the second direction D2 of the light beam L6 diverge. By comparison with the light source module 100, in the aforementioned light source module 400, when the second bottom surface BS2 configured to have the second bottom surface micro-structures 424 of the second light guide plate 420 stacked above is in the wide viewing angle mode, the viewing angle on the first direction D1 and the second direction D2 is wider, thus the viewing angle difference is more obvious between the wide viewing angle mode and the anti-spy mode.

Figure 5A:
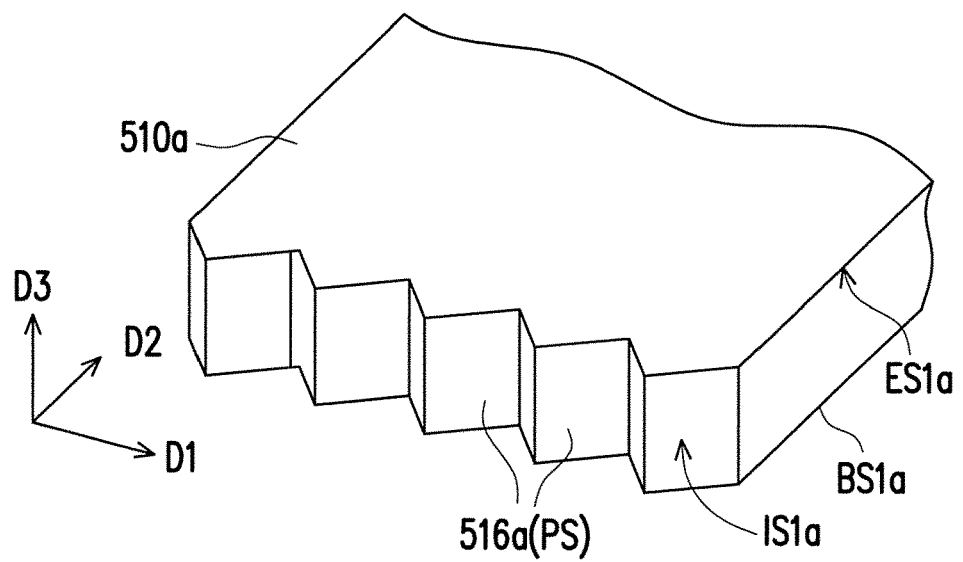
FIG. 5A is a three-dimensional schematic view illustrating a part of a light guide plate of yet another embodiment of the invention.

FIG. 5A is a three-dimensional schematic view illustrating a part of a light guide plate of yet another embodiment of the invention, referring to FIG. 5A. To be more specific, in the related embodiments of the invention, at least one of the first light incident surface of the first light guide plate and the second light incident surface of the second light guide plate of the light source module has a plurality of micro-structures. The micro-structures are arranged along the first direction D1, and the micro-structures are extended along the third direction D3. The micro-structures are exemplarily described based on the light guide plate 510a in the FIG. 5A as followings. The light guide plate 510a may be, for example, the first light guide plate or the second light guide plate of the light source module. In the embodiment, the light guide plate 510a is similar to the second light guide plate 120 of the embodiment in FIG. 1A. The members and the related description of the light guide plate 510a may refer to the members and the related description of the second light guide plate 120 of the embodiment in FIG. 1A, and will not be repeated. The differences between the light guide plate 510a and the second light guide plate 120 are described as followings. The light incident surface IS1a of the light guide plate 510a has a plurality of micro-structures 516a. The micro-structures 516a are arranged along the first direction D1, and the micro-structures 516a are extended along the third direction D3. To be more specific, each of the micro-structures 516a is a pillar structure PS, such as a prismatic structure. The pillar structure PS is connected to the light exiting surface ES1a and the bottom surface BS1a. When the light guide plate 510a is adopted to serve as the second light guide plate of the light source module, a light beam emitted by the second light source enters the light guide plate 510a via the micro-structures 516a. The pillar structure PS of each of the micro-structures 516a has two surfaces, one surface is configured to deflect a normal incident part of the light beam toward the first direction D1, another surface is configured to deflect a normal incident part of the light beam toward a direction opposite to the first direction D1. Therefore, the light beam entering the light guide plate 510a via the micro-structures 516a is diverged on the first direction D1, thus after the light beam of the second light source exits from the light exiting surface ES1a of the light guide plate 510a, the entire light divergence angle on the first direction D1 of the light beam is increased.

In some embodiments, according to actual optical requirements, the first light guide plate or the second light guide plate is optionally configured as the light guide plate 510a having the micro-structures 516a, such that the entire light divergence angle on the first direction D1 of the light beam from the first light source is different from the entire light divergence angle on the first direction D1 of the light beam from the second light source. The light source modules in these embodiments may be similar to the light source module 100 as shown in FIG. 1A, so as to make the display apparatus have the anti-spy effect. In addition, the user may optionally select to use the anti-spy mode or the wide viewing angle mode, so as to further achieve convenience in use. Otherwise, in other embodiments, the micro-structures 516a may be, for example, cylindrical structures, the surface of each of the cylindrical structures has an arc shape. In a different way, the micro-structures 516a may be other types of the pillar structures. Moreover, the micro-structures 516a may be concave structures or concave structures, the invention is not limited thereto.

Figure 5B:
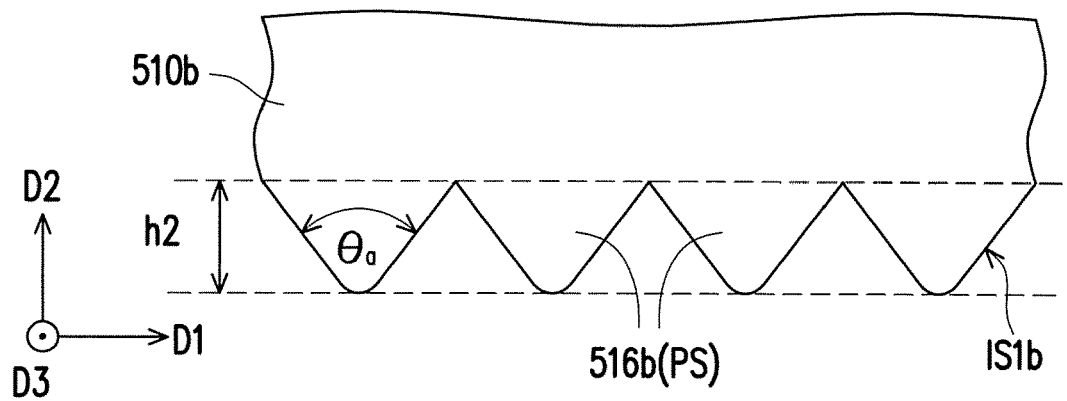
FIG. 5B is a schematic top view illustrating a part of a light guide plate of yet another embodiment of the invention.
Figure 5C:
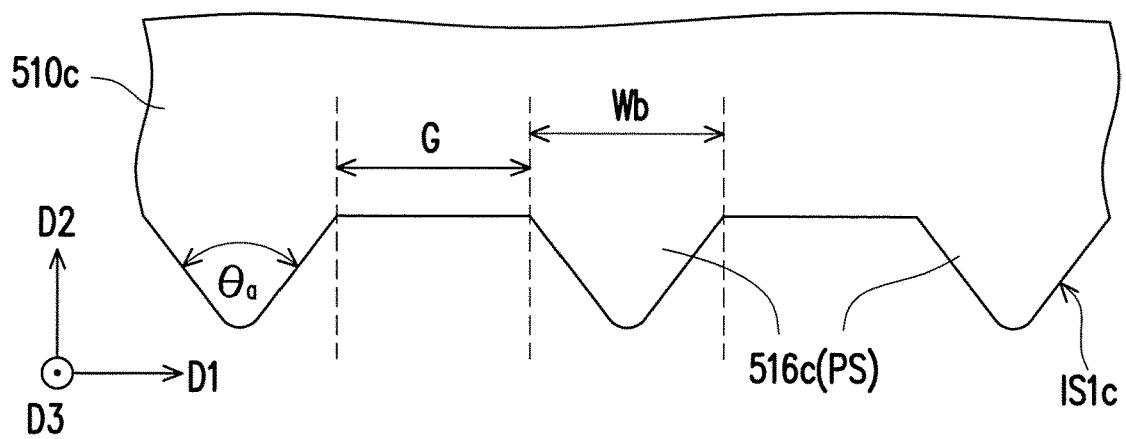
FIG. 5C is a schematic top view illustrating a part of a light guide plate of yet another embodiment of the invention.

FIG. 5B is a schematic top view illustrating a part of a light guide plate of yet another embodiment of the invention, and FIG. 5C is a schematic top view illustrating a part of a light guide plate of yet another embodiment of the invention. The light guide plate 510b of the embodiment in FIG. 5B and the light guide plate 510c of the embodiment in FIG. 5C are similar to the light guide plate 510a of the embodiment in FIG. 5A. The members and the related description of the light guide plate 510b and the light guide plate 510c may refer to the members and the related description of the light guide plate 510a of the embodiment in FIG. 5A, and will not be repeated. Firstly, referring to FIG. 5B, the differences between the light guide plate 510b and the light guide plate 510a are described as followings. In the embodiment, the light incident surface IS1b of the light guide plate 510b has a plurality of micro-structures 516b. Each of the micro-structures 516b is a pillar structure PS, and the apex angle of the pillar structure PS is a round angle. In other words, the apex angle of the pillar structure PS has an arc shape. Specifically, the included angle of the apex angle is 100 degrees, for example. Otherwise, the height h2 of the pillar structure PS is 20 micrometers, for example. However, in other embodiments, the apex angle of the pillar structure PS may also have other included angles, and the pillar structure PS may have other heights. In addition, in other embodiments, the heights h2 of the pillar structures PS may be equal to each other or may not be equal to each other. For example, the heights h2 of the pillar structures PS may be gradually changed along the first direction D1 or may be gradually changed along other directions, the invention is not limited thereto. Next, referring to FIG. 5C, the differences between the light guide plate 510c and the light guide plate 510a are described as followings. In the embodiment, the light incident surface IS1c of the light guide plate 510c has a plurality of micro-structures 516c. Each of the micro-structures 516c is a pillar structure PS, and the apex angle of the pillar structure PS is a round angle. In addition, the two adjacent micro-structures 516c have a gap G therebetween, and the gap G is essentially equal to a bottom surface width Wb of each of the micro-structures 516c. To be more specific, each of the micro-structures 516c is projected along the second direction D2 onto a plane that the second direction D2 is perpendicular to, the length of each of the micro-structures 516c along the first direction D1 is the bottom surface width Wb. In other embodiments, the gap G and the bottom surface width Wb are appropriately designed according to actual optical requirements. For example, in other embodiments, the gaps between each adjacent two of the micro-structures 516c may be equal to each other or may not be equal to each other, and the bottom surface widths Wb of the micro-structures 516c may be equal to each other or may not be equal to each other, the invention is not limited thereto.

FIG. 6A is an analog view illustrating a view angle distribution of a light source module having a single light guide plate in an embodiment of the invention, FIG. 6B is an analog view illustrating a view angle distribution of a light source module having a single light guide plate in another embodiment of the invention, FIG. 6C is an analog view illustrating a view angle distribution of a light source module having a single light guide plate in yet another embodiment of the invention, and FIG. 6D is an analog view illustrating a view angle distribution of a light source module having a single light guide plate in yet another embodiment of the invention. In addition, Table 1 below includes analog results of view angle distributions of the light source modules having a single light guide plate of the embodiments in FIG. 6A to FIG. 6D. Specifically, all the bottom surfaces of the single light guide plates in the embodiments have the first bottom surface micro-structures 114 of the embodiment shown in FIG. 1A. It should be noted here, the invention is not limited by the data listed in the Table 1 below, after one of ordinary skill in the art references to the invention, appropriate modifications may be made based on principles of the invention by changing parameters and settings, however such modifications are within the scope of the invention.

TABLE 1

|  | No. 1 | No. 2 | No. 3 | No. 4 |
|---|---|---|---|---|
| Structure of light exiting surface | Lenticular lens structure | Specular surface | Specular surface | Specular surface |
| Structure of light incident surface | Specular surface | Specular surface | Prismatic structure, apex angle as a round angle | Prismatic structure |
| Horizontal view angle (degree) | 37.02 | 71.67 | 86.11 | 117.97 |

TABLE 1-continued

|  | No. 1 | No. 2 | No. 3 | No. 4 |
|---|---|---|---|---|
| Vertical view angle (degree) | 17.74 | 18.36 | 19.18 | 19.69 |

Referring to Table. 1, in the embodiment, each of No. 1 to No. 4 is an exemplary embodiment of a light source module having a single light guide plate, and the analogy results of the view angle distribution of the light source modules are shown in Table. 1. The No. 1 embodiment is corresponding to the embodiment in FIG. 6A, in the No. 1 embodiment, the structure of the light exiting surface is "lenticular lens structures", it represents that the lenticular lens structures 112 at the light exiting surface of the light guide plate of the embodiment in FIG. 1A is adopted. Particularly, the curvature radius and the height of the lenticular lens structure are 30 micrometers and 7 micrometers, respectively. In addition, the structure of the light incident surface is a "specular surface", it represents that the light incident surface of the light guide plate does not have micro-structures. In the analogy results of the view angle distribution of the embodiment, the horizontal view angle of the light source module is 37.02 degrees, and the vertical view angle of the light source module is 17.74 degrees. In addition, the No. 2 embodiment is corresponding to the embodiment in FIG. 6B, in the No. 2 embodiment, the structure of the light exiting surface is "specular surface", it represents that the light exiting surface of the light guide plate does not have lenticular lens structures. The structure of the light incident surface is a "specular surface", it represents that the light incident surface of the light guide plate does not have micro-structures. In the analogy results of the view angle distribution of the embodiment, the horizontal view angle of the light source module is 71.67 degrees, and the vertical view angle of the light source module is 18.36 degrees.

In addition, the No. 3 embodiment is corresponding to the embodiment in FIG. 6C, in the No. 3 embodiment, the structure of the light exiting surface is specular surface, it represents that the light exiting surface of the light guide plate does not have lenticular lens structures. The structure of the light incident surface is "prismatic structure, apex angle as a round angle", it represents that the micro-structures 516b at the light incident surface of the light guide plate of the embodiment in FIG. 5B is adopted. Specifically, the apex of the micro-structures 516b has a round angle, the curvature radius of the round angle is 5 micrometers. The curvature radius of the apex angle of the micro-structures 516b is 100 micrometers, and the height of the micro-structures 516b is 20 micrometers. In the analogy results of the view angle distribution of the embodiment, the horizontal view angle of the light source module is 86.11 degrees, and the vertical view angle of the light source module is 19.18 degrees. In addition, the No. 4 embodiment is corresponding to the embodiment in FIG. 6D, in the No. 4 embodiment, the structure of the light exiting surface is "specular surface", it represents that the light exiting surface of the light guide plate does not have lenticular lens structures. The structure of the light incident surface is "prismatic structure", it represents that the micro-structures 516a at the light incident surface of the light guide plate of the embodiment in FIG. 5A is adopted. Particularly, the curvature radius of the apex angle of the micro-structures 516a is 100 micrometers, and the height of the micro-structures 516a is 20 micrometers. In the analogy results of the view angle distribution of the embodiment, the horizontal view angle of the light source module is 117.97 degrees, and the vertical view angle of the light source module is 19.69 degrees.

FIG. 6E is an analog view illustrating a view angle distribution of a light source module having a single light guide plate in yet another embodiment of the invention, FIG. 6F is an analog view illustrating a view angle distribution of a light source module having a single light guide plate in yet another embodiment of the invention, FIG. 6G is an analog view illustrating a view angle distribution of a light source module having a single light guide plate in yet another embodiment of the invention, and FIG. 6H is an analog view illustrating a view angle distribution of a light source module having a single light guide plate in yet another embodiment of the invention. In addition, Table 2 below includes analogy results of view angle distributions of the light source modules having a single light guide plate of the embodiments in FIG. 6E to FIG. 6H. Specifically, all the bottom surfaces of the single light guide plates in the embodiments have the second bottom surface micro-structures 324 (the scattering micro-structures MS) of the embodiment shown in FIG. 3A. It should be noted here, the invention is not limited by the data listed in the Table 2 below, after one of ordinary skill in the art references to the invention, appropriate modifications may be made based on principles of the invention by changing parameters and settings, however such modifications are within the scope of the invention.

TABLE 2

|  | No. 5 | No. 6 | No. 7 | No. 8 |
|---|---|---|---|---|
| Structure of light exiting surface | Specular surface | Specular surface | Specular surface | Specular surface |
| Structure of light incident surface | Specular surface | Prismatic structure | Prismatic structure | Prismatic structure, having gaps |
| Horizontal view angle (degree) | 58.67 | 80.77 | 69.39 | 65.16 |
| Vertical view angle (degree) | 26.51 | 31.94 | 29.73 | 28.40 |

Referring to Table. 2, in the embodiment, each of No. 5 to No. 8 is an exemplary embodiment of a light source module having a single light guide plate, and the analogy results of the view angle distribution of the light source modules are shown in Table. 2. In addition, the No. 5 embodiment is corresponding to the embodiment in FIG. 6E, in the No. 5 embodiment, the structure of the light exiting surface is "specular surface", it represents that the light exiting surface of the light guide plate does not have lenticular lens structures. The structure of the light incident surface is a "specular surface", it represents that the light incident surface of the light guide plate does not have micro-structures. In the analogy results of the view angle distribution of the embodiment, the horizontal view angle of the light source module is 58.67 degrees, and the vertical view angle of the light source module is 26.51 degrees. Otherwise, in the No. 6 embodiment, the structure of the light exiting surface is "specular surface", represents that the light exiting surface of the light guide plate does not have lenticular lens structures. The structure of the light incident surface is "prismatic structure", it represents that the micro-structures 516a at the light incident surface of the light guide plate of the embodiment in FIG. 5A is adopted. Particularly, the curvature radius of the apex angle of the micro-structures 516a is 100 micrometers, and the height of the micro-structures 516a is 20 micrometers. In the analogy results of the view angle distribution of the embodiment, the horizontal view angle of the light source module is 80.77 degrees, and the vertical view angle of the light source module is 31.94 degrees.

In addition, the No. 7 embodiment is corresponding to the embodiment in FIG. 6G, in the No. 7 embodiment, the structure of the light exiting surface is "specular surface", it represents that the light exiting surface of the light guide plate does not have lenticular lens structures. The structure of the light incident surface is "prismatic structure", it represents that the micro-structures 516a at the light incident surface of the light guide plate of the embodiment in FIG. 5A is adopted. Particularly, the curvature radius of the apex angle of the micro-structures 516a is 20 micrometers, and the height of the micro-structures 516a is 20 micrometers. In the analogy results of the view angle distribution of the embodiment, the horizontal view angle of the light source module is 69.39 degrees, and the vertical view angle of the light source module is 29.73 degrees. In addition, the No. 8 embodiment is corresponding to the embodiment in FIG. 6H, in the No. 8 embodiment, the structure of the light exiting surface is "specular surface", it represents that the light exiting surface of the light guide plate does not have lenticular lens structures. The structure of the light incident surface is "prismatic structure, having gaps", it represents that the micro-structures 516c at the light incident surface of the light guide plate of the embodiment in FIG. 5C is adopted. Particularly, the curvature radius of the apex angle of the micro-structures 516c is 100 micrometers, and the height of the micro-structures 516c is 20 micrometers. The two adjacent micro-structures 516c have a gap G therebetween, and the gap G is essentially equal to the bottom surface width Wb of each of the micro-structures 516c (as shown in FIG. 5C). In the analogy results of the view angle distribution of the embodiment, the horizontal view angle of the light source module is 65.16 degrees, and the vertical view angle of the light source module is 28.40 degrees.

Figure 7:
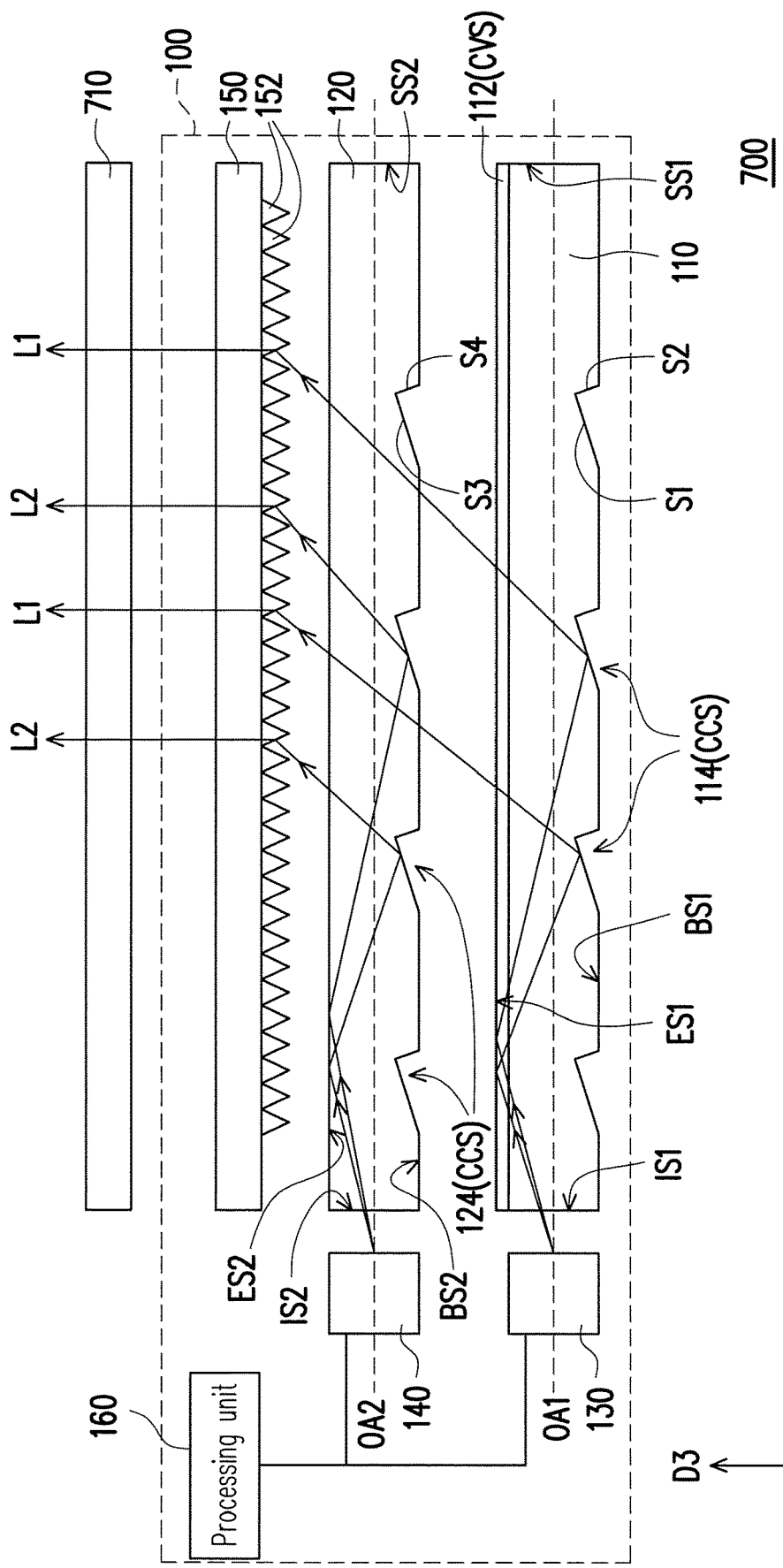
FIG. 7 is a cross-sectional schematic view illustrating a display apparatus in an embodiment of the invention.

FIG. 7 is a cross-sectional schematic view illustrating a display apparatus in an embodiment of the invention, referring to FIG. 7. In the embodiment, the display apparatus 700 includes a display panel 710 and the light source module 100 of the embodiment in FIG. 1A. The light source module 100 is configured to provide the light beam L1 and the light beam L2 to the display panel 710. To be more specific, the display panel 710 is a transparent display panel or other types of the display panels, for example. Otherwise, the light source module 100 may at least adopt the light source module 200 of the embodiment in FIG. 2A, the light source module 300 of the embodiment in FIG. 3A, the light source module 400 of the embodiment in FIG. 4A, or other types of the light source modules. In addition, at least one of the first light guide plate 110 and the second light guide plate 120 of the light source module 100 of the embodiment may adopt the light guide plate 510a of the embodiment in FIG. 5A, the light guide plate 510b of the embodiment in FIG. 5B, the light guide plate 510c of the embodiment in FIG. 5C, or other types of the light guide plates, the invention is not limited thereto. In the present embodiment, since the lenticular lens structures 112 may reduce the light divergence angle of the light beam L1 emitted from the first light source 130. Therefore, the light source module 100 in the embodiments of the invention is capable of selecting light that exits with a smaller light divergence angle, such that the display apparatus 700 has an anti-spy effect. In addition, the user may optionally select to use the anti-spy mode or the wide viewing angle mode, so as to further achieve convenience in use.

In summary, the embodiments of the invention have at least one of the advantages or effects below. In the light source module and the display apparatus of the embodiments of the invention, the first light guide plate and the second light guide plate are sequentially stacked up, and the second light guide plate is disposed between the first light guide plate and the turning film. The first light source is disposed beside the first light guide plate, and the second light source is disposed beside the second light guide plate. The first light guide plate includes a first light exiting surface, the first light exiting surface is located at a side of the first light guide plate facing the turning film of the first light guide plate and has a plurality of lenticular lens structures. The lenticular lens structures are arranged along a first direction, and the lenticular lens structures are extended along a second direction perpendicular to the first direction. The lenticular lens structures may reduce the light divergence angle of the light beam emitted from the first light source. Therefore, the light source module in the embodiments of the invention is capable of selecting light that exits with a smaller light divergence angle, such that the display apparatus has an anti-spy effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light source module, comprising:
a first light guide plate;
a first light source, disposed beside the first light guide plate;
a second light guide plate, the first light guide plate and the second light guide plate being sequentially stacked up;
a second light source, disposed beside the second light guide plate; and
a turning film, the second light guide plate being disposed between the first light guide plate and the turning film, the turning film having a plurality of prism columns, the prism columns facing the second light guide plate,
wherein the first light guide plate comprises a first light exiting surface and a first light incident surface connected to the first light exiting surface, a light beam emitted by the first light source enters the first light guide plate via the first light incident surface, the first light exiting surface is located at a side facing the turning film and has a plurality of lenticular lens structures, the lenticular lens structures are arranged along a first direction, and the lenticular lens structures are extended along a second direction perpendicular to the first direction,
wherein a height of each of the lenticular lens structures gradually increases along a direction from a side of the first light incident surface to a side away from the first light incident surface; and
wherein the first light guide plate comprises a first bottom surface, the first bottom surface and the first light exiting surface are located at two opposite sides of the first light guide plate, and the first bottom surface has a plurality of first bottom surface micro-structures, the first bottom surface micro-structures are concave structures or convex structures, the shape of the first bottom surface micro-structures are the same, each of the concave structures or the convex structures has a first surface and a second surface connected to each other, and each first surface is a flat surface and faces the first light source.

2. The light source module as recited in claim 1, wherein the second direction is parallel to an optical axis of the first light source.

3. The light source module as recited in claim 1, wherein the second light guide plate comprises a second bottom surface, the second bottom surface faces the first light exiting surface, and at least one of the first bottom surface and the second bottom surface has a plurality of bottom surface micro-structures.

4. The light source module as recited in claim 3, wherein the second bottom surface and the first light exiting surface are disposed adjacent to each other.

5. The light source module as recited in claim 3, wherein the second bottom surface has a plurality of second bottom surface micro-structures, the second bottom surface micro-structures are scattering micro-structures.

6. The light source module as recited in claim 1, wherein each of the lenticular lens structures is a convex structure.

7. The light source module as recited in claim 1, wherein the second light guide plate comprises a second light incident surface, and a light beam emitted by the second light source enters the second light guide plate via the second light incident surface, wherein at least one of the first light incident surface and the second light incident surface has a plurality of micro-structures, the micro-structures are arranged along the first direction, the micro-structures are extended along a third direction, the third direction is perpendicular to the first direction, and the third direction is perpendicular to the second direction.

8. The light source module as recited in claim 7, wherein two adjacent micro-structures have a gap therebetween.

9. The light source module as recited in claim 7, wherein each of the micro-structures is a pillar structure.

10. A display apparatus, comprising a display panel and a light source module,
the light source module being configured to provide a light beam to the display panel, the light source module comprising:
a first light guide plate;
a first light source, disposed beside the first light guide plate;
a second light guide plate, the first light guide plate and the second light guide plate being sequentially stacked up;
a second light source, disposed beside the second light guide plate; and
a turning film, the second light guide plate being disposed between the first light guide plate and the turning film, the turning film having a plurality of prism columns, the prism columns facing the second light guide plate,
wherein the first light guide plate comprises a light exiting surface located at a side facing the turning film and a light incident surface connected to the light exiting surface, the light beam emitted by the light source module enters the first light guide plate via the light incident surface, the light exiting surface has a plurality of lenticular lens structures, the lenticular lens structures are arranged along a first direction, and the lenticular lens structures are extended along a second direction perpendicular to the first direction,
wherein a height of each of the lenticular lens structures gradually increases along a direction from a side of the light incident surface to a side away from the light incident surface; and
wherein the first light guide plate comprises a first bottom surface, the first bottom surface and the first light exiting surface are located at two opposite sides of the first light guide plate, and the first bottom surface has a plurality of first bottom surface micro-structures, the first bottom surface micro-structures are concave structures or convex structures, the shape of the first bottom surface micro-structures are the same, each of the concave structures or the convex structures has a first surface and a second surface connected to each other, and each first surface is a flat surface and faces the first light source.

11. A light source module, comprising:
a first light guide plate;
a first light source, disposed beside the first light guide plate;
a second light guide plate, the first light guide plate and the second light guide plate being sequentially stacked up;
a second light source, disposed beside the second light guide plate; and
a turning film, the second light guide plate being disposed between the first light guide plate and the turning film, the turning film having a plurality of prism columns, the prism columns facing the second light guide plate,
wherein the first light guide plate comprises a first light exiting surface and a first light incident surface connected to the first light exiting surface, a light beam emitted by the first light source enters the first light guide plate via the first light incident surface, the first light exiting surface is located at a side facing the turning film and has a plurality of lenticular lens structures, the lenticular lens structures are arranged along a first direction, and the lenticular lens structures are extended along a second direction perpendicular to the first direction, wherein a height of each of the lenticular lens structures gradually or decreases along a direction from a side of the first light incident surface to a side away from the first light incident surface;

wherein the first light guide plate comprises a first bottom surface, the first bottom surface and the first light exiting surface are located at two opposite sides of the first light guide plate, and the first bottom surface has a plurality of first bottom surface micro-structures, the first bottom surface micro-structures are concave structures or convex structures, the shape of the first bottom surface micro-structures are the same, each of the concave structures or the convex structures has a first surface and a second surface connected to each other, and each first surface is a flat surface and faces the first light source.

* * * * *